US008370062B1

(12) United States Patent
Starenky et al.

(10) Patent No.: US 8,370,062 B1
(45) Date of Patent: Feb. 5, 2013

(54) SWITCHING BETWEEN LOCATION CONTEXTS

(75) Inventors: Victor Starenky, Waterloo (CA); Alex Kennberg, Waterloo (CA)

(73) Assignee: Google Inc., Mountain View, CA (US)

( * ) Notice: Subject to any disclaimer, the term of this patent is extended or adjusted under 35 U.S.C. 154(b) by 426 days.

(21) Appl. No.: 12/702,303

(22) Filed: Feb. 9, 2010

(51) Int. Cl.
  *G01C 21/12* (2006.01)
(52) U.S. Cl. ........ 701/467; 701/423; 701/532; 701/533; 455/414.1; 455/456.2; 455/456.3; 340/3.3; 340/4.21; 340/995.14; 340/995.18; 715/757; 704/235; 463/13; 463/16
(58) Field of Classification Search .................. 701/200, 701/201, 423, 467, 532, 533; 707/706, 722, 707/999.006, 999.003, E17.014, E17.018; 455/414.1, 414.2, 422.1, 456.1, 456.3, 456.2; 705/1.1, 5, 14.58, 37, 319; 715/760, 757; 607/5; 1/1; 709/217; 340/3.3, 4.21, 995.14, 340/995.18; 704/235; 463/13, 16
See application file for complete search history.

(56) References Cited

U.S. PATENT DOCUMENTS

| 7,069,308 | B2 | 6/2006 | Abrams | |
|---|---|---|---|---|
| 7,522,940 | B2 * | 4/2009 | Jendbro et al. | 455/566 |
| 7,593,738 | B2 * | 9/2009 | Anderson | 455/456.1 |
| 7,593,740 | B2 | 9/2009 | Crowley et al. | |
| 7,788,188 | B2 * | 8/2010 | Kramer | 705/319 |
| 7,856,360 | B2 * | 12/2010 | Kramer et al. | 705/1.1 |
| 8,200,247 | B1 * | 6/2012 | Starenky et al. | 455/456.3 |
| 2010/0125409 | A1 * | 5/2010 | Prehofer | 701/207 |
| 2010/0198917 | A1 * | 8/2010 | Petersen et al. | 709/204 |
| 2011/0009132 | A1 * | 1/2011 | Skarby et al. | 455/456.5 |
| 2011/0142016 | A1 * | 6/2011 | Chatterjee | 370/338 |
| 2011/0196932 | A1 * | 8/2011 | Jackson et al. | 709/206 |

OTHER PUBLICATIONS

Eric, Product Manager, "Yelp Official Blog—You're Gonna Want to 'Check-Out' Yelp for iPhone v.4", [online], Yelp Official Blog. Retrieved on Jan. 15, 2010. Retrieved from: http://officialblog.yelp.com/2010/01/youre-gorma-want-to-checkout-yelp-for-iphone.
"Foursquare (service)", Wikipedia, [online]. Retrieved on Jan. 20, 2010. Retrieved from: http://en.wikipedia.org/wiki/foursquare_(service).
"Foursquare-help", [online], Foursquare. Retrieved on Feb. 3, 2010. Retrieved from: http://foursquare.com/help/.
Thornton, James, "Find shops, restaurants, bars and amenities around you", *Softonic-Let's Download*, http://aroundme.en.softonic.com/iphone, Jan. 27, 2010, 4 pages.

* cited by examiner

*Primary Examiner* — James P. Trammell
*Assistant Examiner* — McDieunel Marc
(74) *Attorney, Agent, or Firm* — Bracewell & Giuliani, LLP

(57) ABSTRACT

In general, the subject matter described in this specification can be embodied in methods, systems, and program products for switching between location contexts on a mobile computing device. An estimated geographic location of the mobile computing device is determined by a mobile computing device. A user-identified location is received from an application program invoked on the mobile computing device. The estimated geographic location and the user-identified location are concurrently stored in computer-readable memory. One of the concurrently-stored locations is identified as a current location. A plurality of interface elements that each identify a venue that is geographically near the current location are presented on a display of the mobile computing device. User input that changes the current location from one to the other of the concurrently-stored locations is received at the mobile computing device.

20 Claims, 10 Drawing Sheets

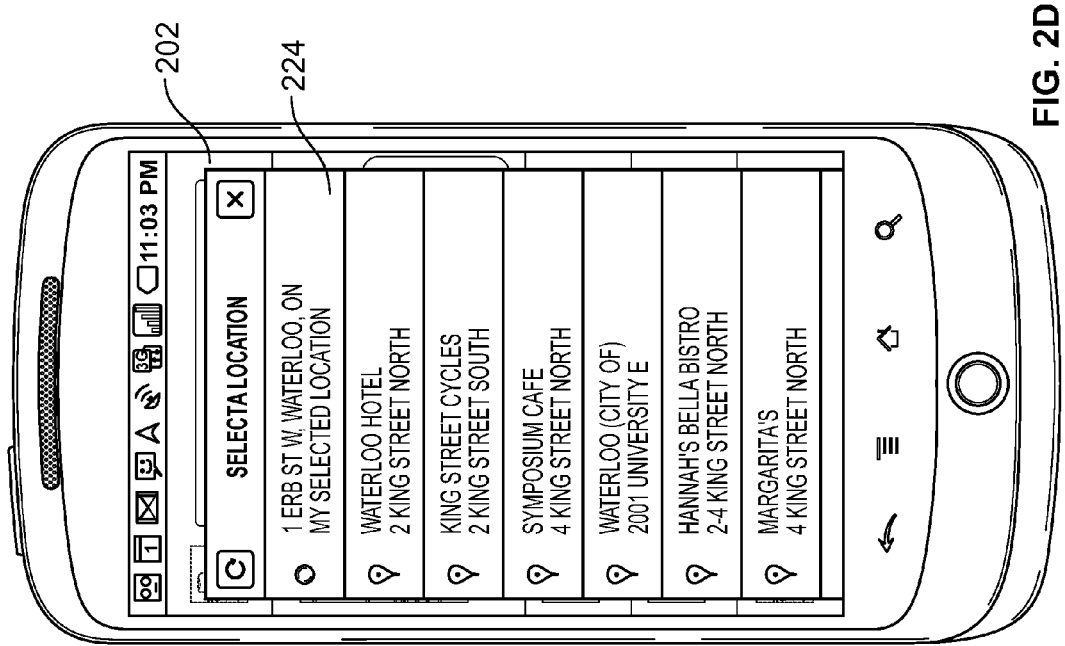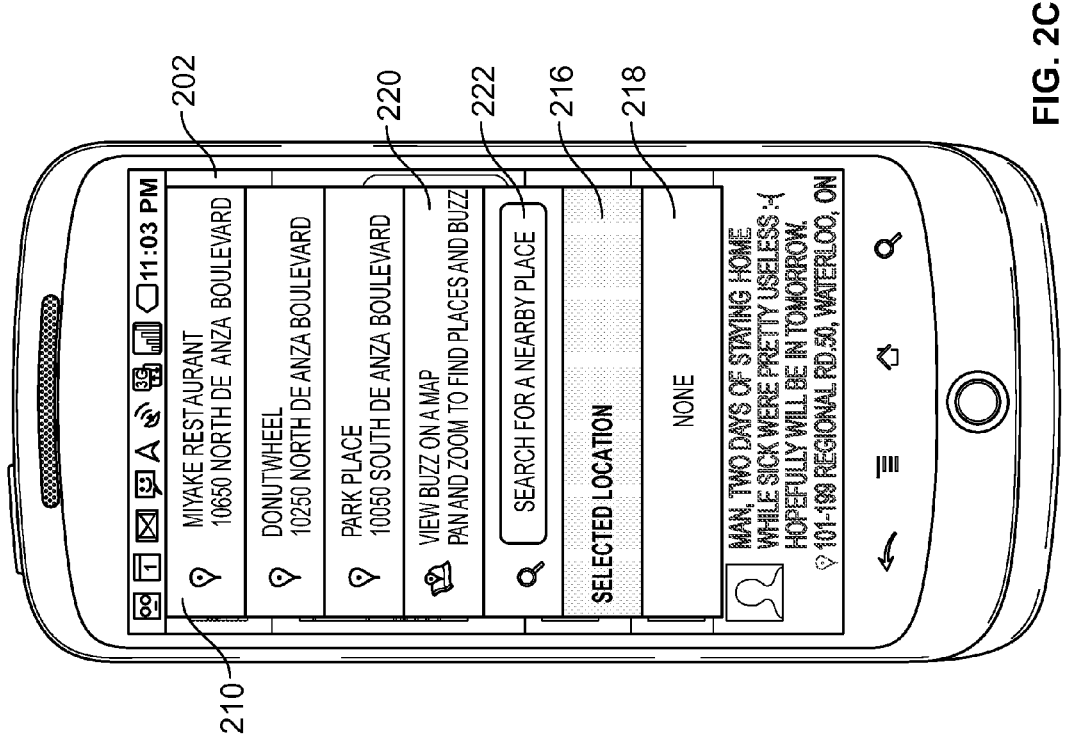
FIG. 2D
FIG. 2C

SWITCHING BETWEEN LOCATION CONTEXTS

TECHNICAL FIELD

This document generally describes techniques, methods, systems, and mechanisms for confirming a venue of user location and switching between location contexts.

BACKGROUND

The present disclosure generally relates to confirming a venue of user location and switching between location contexts. Mobile computing devices such as application telephones and laptop computers can use location-identification systems (e.g., GPS) to determine an estimated geographic location of the device. Using the estimated location, the device may be able to identify venues (e.g., commercial businesses) that are located near the estimated geographic location of the device.

A user of the mobile computing device may use the device to post short textual posts using a micro-blogging application so that other people that use an associated micro-blogging service and that "follow" the user can receive the post. The post can include an identification of where the user (or the user's device) is located when the post was made.

SUMMARY

This document describes techniques, methods, systems, and mechanisms for confirming a venue of user location and switching between location contexts.

In general, a user of an application telephone may use a micro-blogging application to submit short textual posts to a micro-blogging service. The posts may be transmitted from the mobile computing device to a central server where the posts are disseminated to computing devices of other people. These other people may view the posts by using the same micro-blogging application or logging into a website that displays a stream of posts by other people that use the micro-blogging service. In particular, some people may "follow" or subscribe to the user, so that these other people receive the user's posts. Also, posts by the user that happen to be highly rated by automated algorithms (e.g., based on views or ratings) can be provided to other people that do not "follow" the user. These other people may be "friends of friends" of the user, or otherwise in a related association in a social network graph.

The user's posts may be associated with a location of the user's application telephone at a time of the post. For example, the user may opt to have the latitude and longitude, current city or geographic region, or commercial business displayed as a place of posting. Thus, an example post may state "I just had the best prime rib ever!!!, Jimmy's Steakhouse (Tampa, Fla.)." The user may not have typed "Jimmy's Steakhouse (Tampa, Fla.)." In some examples, the application telephone automatically inserts the place of posting into the textual post. In other examples, the place of posting may be selected by the user for inclusion.

People that use the micro-blogging application and that receive the post about Jimmy's prime ribs may be provided, by the micro-blogging application, an ability to receive additional information on the user's place of posting. For example, the people that receive the steakhouse post can view a map, telephone number, reviews, or a website link for Jimmy's Steakhouse.

Determining a place of posting for inclusion in a post may require that the application telephone identify a current location of the telephone, which may be ambiguous at times. Positioning technology on the mobile telephone may not define a location of the telephone with absolute certainty. Also, some locations may be associated with multiple places of posting. For example, a person standing near a hot dog stand on a Florida beach, and watching a surfing competition may be associated with the places (1) Daytona Beach, (2) Bob's hot dog stand, (3) 7th Annual Daytona Beach Surfing Competition, and (4) Florida. Thus, the user may need to either select the place of posting or verify a suggested location.

In some instances, the user of the micro-blogging application may want to select a place of posting that is not near his current location (e.g., the place of posting may be more than 5, 10, 50, 100, 500, or 1000 km away). As an illustration, suppose that the user, when eating Jimmy's prime ribs, remembered an incredible steakhouse that he visited while passing through Stockholm, Sweden. The micro-blogging application program may provide an ability to set a posting location as a remote place (e.g., by invoking a maps application and selecting the city of Stockholm or selecting the "All-American Steakhouse" in Stockholm). Thus, the user may post, "This is the best steakhouse that I have ever been to!, All-American Steakhouse (Stockholm)," even if the user was at Jimmy's Steakhouse back in the States.

In some implementations of the micro-blogging application, a user post that is accompanied by a description of a place of posting may include a "verified location" badge or indicator. The verified badge may appear when the place of posting is near the estimated geographic location of the user's application telephone, or when the place of posting is one of several venues (e.g., commercial businesses, residential addresses, public places of interest, or political subdivisions) that are suggested to the posting user based on the estimated geographic location of the telephone. For example, a person that alleges to be reporting first-hand information from the site of a natural disaster may gain credibility if the posting is accompanied by a badge that verifies that the person is at the natural disaster and not his home. The application telephone may not present options that allow the user to insert the verified badge into a posting when the posting includes a place of posting that is not near an estimated geographic position of the application telephone.

One aspect of the micro-blogging application may include a feature that recommends to the user a single venue as a present location of the user, and prompts the user to confirm the location. For example, the application telephone may determine an approximate geographic location of the application telephone and determine, in cooperation with a computerized server system, a suggested venue at which the user (and the mobile telephone) may be located.

A graphical interface on a display of the application telephone may display graphical interface elements (e.g., text, lines, pictures, shapes, or combinations thereof) related to various features of the micro-blogging application. On the described graphical interface, a graphical interface element may appear that presents an estimated geographic location of the mobile telephone (e.g., "1945 5th Ave, Tampa, Fla."). At the same time as the presentation of the estimated geographic location—or at some later point in time when the suggested venue is identified by the application telephone—a suggested venue may display on the graphical interface, possibly in same interface element as the estimated location (e.g., within a boundary of a selectable interface element, where regions of the graphical interface outside of the boundary are not selectable to confirm the suggested venue).

The display of the suggested venue may be accompanied by a prompt that the user confirm that the user is indeed located at, or otherwise associated with, the suggested venue. The prompt may request that the user perform an action (e.g., tap a selectable interface element on touchscreen or press a specific hardware button on the telephone) to confirm that the user is at the suggested venue. The user-input confirming the location may be performed by a single action (e.g., a single tap or swipe of the touchscreen or a single press of a button on the telephone) that occurs while the prompt is displayed. Thus, the user need not provide multiple user-inputs to confirm that the user is at the suggested venue upon first viewing the prompt. The prompt may appear on the same interface element as the estimated location and the suggested venue. The same interface element may be an interface element that is selected by user touchscreen contact over a region corresponding to a display of the element.

Upon a user confirmation of the suggested location, the estimated location and the prompt may disappear from the graphical interface, leaving only a statement of the user's venue on the selected interface element. If the user submits a post to the micro-blogging application, the now confirmed venue may accompany the post and be presented as a place of user posting to other people when these others view the post. Prior to the confirmation, the suggested venue may not accompany posts made by the user. Prior posts may not include a place of posting or may include a previously confirmed location of the application telephone.

In some examples, in a particular view of the graphical interface, the suggested venue is provided as an only suggested venue. No other venues may be displayed in the particular view as suggestions of venues that the user may be located at. In some examples, no other venues or locations (other than possibly the estimated geographic location of the application telephone) may display in the view with the only suggested venue. In some examples, the only suggested venue may be an only venue displayed on the graphical interface at a particular moment that includes a confirmational prompt. The only suggested venue may never have been previously selected or seen by a user of the mobile telephone and may never have been viewed on a display of the mobile computing device.

The user may also be able to invoke a display of additional suggested locations by tapping a particular graphical interface element on the screen. Upon launching the micro-blogging application program from a generic view of the application telephone desktop, the display of additional suggested location may only be viewable by navigating through a view of the micro-blogging application program that presents the only suggested venue, or is configured to present the only suggested venue and no other suggested venues.

In some examples, the user may be able to clear the confirmed location by tapping or otherwise invoking a particular graphical interface element on the display. Clearing the confirmed location may result in user micro-blogging posts not being accompanied by a place of posting.

The application telephone may determine a venue to suggest to the user by transmitting the estimated geographic location of the mobile telephone to a server system. The transmission may include an accuracy of the estimated geographic location and may include an identification of the application telephone or an identification of a user account that is associated with the user. The server system may use the received information to determine one or more venues to provide to the application telephone as suggested venues.

Multiple signals may be used to determine the suggested venues. Example signals include: (i) estimated geographic location of the application telephone, (ii) accuracy of the estimated geographic location reading, (iii) user history of confirming a particular suggested venue as a location at which the user is located, (iv) user history of selecting a search result associated with the venue as a response to submission of a search engine query, (v) user history of submitting search engine queries for terms or categories that are associated with the venue, (vi) general popularity of a search engine search result associated with the venue, (vii) user-rankings of the venue, (viii) time-dependency of signals (e.g., if more people confirm the "beach" during the summer or select "beach" search results in the afternoon), and (ix) a popularity of the venue based on a number of financial transactions that occur at the venue.

In some implementations, the server system weights the signals to emphasize some signals over others (e.g., the user history of confirming a venue may be weighted more heavily than people's ratings of a venue). Based on the weighting, scores for multiple venues are generated and a single suggested venue is determined and provided to the application telephone for confirmation by the user. In some implementations, the weighting is split between the server system and the application telephone so that some of the weightings are performed at the server system and some are performed at the application telephone. For example, the server system may provide to the application telephone a ranked list of suggested venues. The application telephone may select the highest ranked venue from the list that is within a threshold distance of the estimated location of the mobile telephone (e.g., within a distance that may be based on the accuracy of the estimated location reading). Thus, the venue that the mobile device or the server system selects as the suggested venue may not be the venue that is closest to the estimated geographic location.

In some implementations, the application telephone may only be able to identify a sequential, integer-based ranking of the suggested venues that are received from the server system. For example, if five venues are received, the application telephone may only be able to assign them values of 1, 2, 3, 4, and 5. Thus, the application telephone may be prevented from obtaining too much information on the weightings performed by the server system to safeguard against reverse engineering of server system algorithms. In contrast, in some implementations, the application telephone receives with each venue in the list a relevancy score of the venue (e.g., 89.3, 88.9, 45.4, 43.0, and 23.1). Using each venue's relevancy score, the application telephone may perform more particularized weighting on the client device side.

As an illustration, suppose that the venue with a score of 89.3 is located 860 meters from the estimated geographic location of the application telephone, but the venue with the score of 88.9 is located 15 meters from the estimated geographic location. In the above example where the venues are blindly ranked, the venue with the highest score of 89.3 may be selected as the suggested venue (e.g., if the venue is within the threshold distance of, for example, 1000 meters). If the application telephone, however, receives the scores of 89.3 and 88.9, the application telephone may weight the distance from the estimated geographic location and the score to determine that the second highest scored venue may be determined to be more relevant because the second highest scored venue has a high score and is very close to the estimated location.

Another aspect of the micro-blogging application may include an ability to toggle between two location contexts. For example, the application telephone may use a "current" location of the application telephone to (i) present a list of venues that are near the user and that the user may be interested in obtaining information on, or (ii) present a list of suggested venues at which the user may be located. The user, however, may want to toggle the "current" location between an estimated geographic location of the application telephone and a geographic location that the user selects.

As an illustration, the micro-blogging application may present a list of venues that may be of interest to the user based on a "current" location of the user. A user may select one of these venues of interest to obtain additional information on the venue. For example, selection of a venue of interest may present: (i) a map indicating a location of the venue of interest, (ii) directions to the venue of interest, (iii) micro-blogging application user reviews of the venue of interest, (iv) a link to a website for the venue of interest, (v) a description of the venue of interest, (vi) hours of operation for the venue of interest, (vii) a telephone number for the venue of interest, or any combination of the above descriptive content. In some examples, some of the above descriptive content may accompany a name of the venue in the list that is presented for display to the user (e.g., the user does not need to select the venue from the list).

The list of venues may be populated by the application telephone based on a "current" location of the user that is the estimated geographic location. The user, however, may be able to choose a secondary, selected location. As an illustration, the user may invoke an electronic maps application, and select using the electronic maps application, a location, or a venue. Thus, if the user is located in Florida, he may use a map application to select the location of "Stockholm, Sweden." The map application may return to the user coordinates of the selected location or a venue that was selected using the map application.

Selection of the secondary, selected location using the map may result in the micro-blogging application setting the "current" location as the user-identified or selected location and populating the list of venues of interest with venues in or near Stockholm. If the maps application was launched from the micro-blogging application and while a list of venues of interest was visible, the previous list of venues (e.g., venues in Florida) may be replaced by venues associated with the new location (e.g., venues in Stockholm).

The application telephone may concurrently store both the estimated geographic location and the selected location in computer-readable memory. Thus, a user may be able to toggle a current location or context of the micro-blogging application without invoking an application program and selecting another place (or the same place). Indeed, the user may toggle the location context of the micro-blogging application with a single user input. In some implementations, a selectable interface element is presented that enables a one-input toggling of location context. The selectable interface element may include a display of the other of the current locations (e.g., if the current location is the estimated geographic location, the other location is the selected location, and vice versa). In other words, a user can switch back and forth between location contexts without invoking an application and re-selecting a location. Once selected, the user can toggle contexts between an estimated geographic location and a selected geographic location.

The application telephone may also concurrently store information relevant to each location context. For example, each context may be associated with any combination of map tiles, information identifying venues on a map, information about each of the identified places (e.g., a website, an address, hours of operation, etc.), weather data, location-specific pictures, and contact information for users of a messaging service. Thus, a computing device may be able to switch back and forth between location contexts without invoking an application, and without the computing device querying a server system to obtain the described information. Information necessary to invoke a visual display for each context may be stored in local memory on the computing device.

In some examples, a list of vertically stacked user-interface elements are presented for display on the application telephone. The list may include: (i) an interface element displaying the current location and a descriptive tag (e.g., "Florida, Best Available Location" or "Stockholm, Selected Location"), (ii) a list of interface elements that each correspond to a venue of interest (e.g., where selection of a venue of interest interface element can perform the operations described above), (iii) an interface element that displays the other of the concurrently stored locations (e.g., where selection of the interface element for the other location switches location context and accordingly the list of venues of interest), and (iv) an interface element for invoking an application to change the selected location.

In various examples, some of the above described interface elements may not be displayed in the illustrated list. In some examples, selection of the "current" location interface element switches the location context and replaces, on the selected interface element, a display of the current location with the other location. In some examples, the interface element that displays the estimated geographic location may update as new location estimates are obtained. If the location context is set to the estimated geographic location, the venues of interest may also update (e.g., change to different locations) as the estimated location is revised. In some examples, the only interface elements in the list that wholly change as context changes are the venues of interest. The position of the estimated location and selected location in the list may change (along with descriptive titles of the location), but the location or venue of the estimated or selected locations may not change. The list may not include interface elements for venues other than those described above (e.g., the list may not includes a third interface element that enable switching location contexts).

In some examples, the described mechanisms for alternating between contexts may be used to set a place of posting for posts submitted with the micro-blogging application. As an illustration, the user may be presented with a single, suggested location stating "Daytona Beach: Is this your location?" The user may actually want to indicate that his current location is "Bob's hot dog stand." Thus, he may select an interface element on the application telephone that invokes a display of multiple suggested venues. The display of suggested venues may be similar to the display of the list of venues of interest, and may display (i) the estimated geographic location of the application telephone, (ii) interface elements denoting multiple suggested venues, (iii) an interface element to invoke an application for selecting a location that is not selected, and (iv) an interface element for selecting a secondary context.

Use of the list of suggested venues is illustrated through two examples. In a first example, the list does include "Bob's hot dog stand" and the user selects a corresponding interface element. In response to selection of the interface element, multiple different actions may occur. The estimated geographic position of the mobile phone may be updated to be the venue "Bob's hot dog stand. Also, the estimated geographic position may remain as an address or latitude and longitude coordinates and the selected location may be set as Bob's hot dog stand.

In a second example, the list does not include "Bob's hot dog stand." Thus, the user can invoke an application program (e.g., an application that can show a list of businesses in Daytona, Fla.) and select "Bob's hot dog stand" with the application program. Upon returning to the application program the selected location can become "Bob's hot dog stand" and the estimated geographic location may remain the same. Thus, a user can switch contexts between the estimated geographic location and the selected location of "Bob's hot dog stand" using the list. A list of nearby venues can change, depending on the selected venue. Thus, as the user moves down the beach to grab a drink at a local cantina, the user may only need to look at the list of suggested venues that accompany his selected location (or potentially the estimated geographic location) in order to select a new venue as a place of posting. The selected location may be used by the microblogging application as a place of posting, and may become the "selected location" so that the list of suggested venues reflects those venues around the new "selected location."

In some examples, if the venue from the list that is selected is within a threshold distance of the estimated geographic location, the estimated geographic location may be updated with the venue that was selected and the "selected" location graphical interface element may remain either empty, or filled with a previously selected location. Thus, the "selected" location context may remain reserved for a location that is geographically separated from a user of the application telephone (e.g., by more than 1, 5, 10, 100, or 500 km). Thus, the "selected" location may be a location for phantom blogging and the "estimated geographic location" may be a location that is around the mobile device.

The capability to switch location contexts may be employed in a variety of applications of a computing device. For example, a maps application program invoked on an mobile telephone may display a list of venues that are near an estimated geographical position of the mobile telephone. The maps application program may also present a selectable interface element that allows the user to switch to a "work" location context. In response, map tiles for a different geographical region may replace the map tiles for the estimated geographical position, and a different set of venue "pins" may appear on the map. The map tiles and the venues information for each context may be stored locally on the mobile telephone, enabling the user to switch between "work" and "estimated geographical position" locations easily and without the mobile telephone querying the server device (e.g., enabling the user to view information on two contexts when the mobile telephone wireless radios are not on).

In some examples, a user may type a query for "hot dog stands" into a search engine interface webpage. A list of search results that are relevant to query may appear. The search engine may provide a list of location-specific search results for two location contexts (e.g., a "home" location and an estimated geographical location of a mobile telephone), but only display information for one of the location contexts. Thus, the user may see information about hot dog stands that are near him presently, or that are near his house (where he may be presently driving). In other examples, a portal page that includes several location-specific widgets includes an interface element that may be selected to toggle between locations. For example, the portal page may include a "weather" widget and a "local news" widget that each display information based on location-specific RSS feeds. The RSS feeds for each widget and for each of two location contexts (i.e., four RSS feeds) may be received substantially concurrently, while information from RSS feeds for a single location context may be displayed at a single time.

In conclusion, the application telephone may include an ability to store two locations or venues and receive user input that switches between the two locations. A current location or context may be used to determine venues for display in a list of venues, while venues that may have been displayed if the other context was invoked may not be shown. The user of the application telephone may toggle between each context with a single user input, potentially of the same interface element (e.g., a "Switch Context" interface element). Multiple nearby venues that are associated with the current location may be displayed in a list. In some examples, selection of one of the nearby locations sets the estimated location or selected venue. In other examples, selection of one of the nearby venues invokes a display of information associated with the selected venue.

In general, one aspect of the subject matter described in this specification can be embodied in a computer-implemented method for verifying a venue associated with a user location. A mobile computing device may determine an estimated geographic location of the mobile computing device. The mobile computing device wirelessly transmits the estimated geographic location to a computerized server system. The mobile computing device receives from the server system in response to the transmitting, an identification of a suggested venue. An interface element that indicates that the mobile computing device may be located at the suggested venue is provided on a display of the mobile computing device. User input that confirms that the user is at the suggested venue is received at the mobile computing device. In response to receiving the user input, the suggested venue is identified as a confirmed venue. A wireless communication that identifies that the user is at the confirmed venue is provided from the mobile computing device.

Another aspect of the subject matter described in this specification can be embodied in a system for verifying a venue associated with a user location. The system includes a mobile computing device to transmit an estimated geographic location of the mobile computing device in a wireless request, and to receive, in a wireless response to the request, a suggested venue. The system includes a location-identification unit to determine the estimated geographic location of the mobile computing device. The system includes a server system to receive the estimated geographic location in the wireless request and return the suggested venue to the mobile computing device in the wireless response. The system includes means to (i) display the suggested venue as a single suggested venue on a display of the mobile computing device with a prompt that a user of the mobile computing device confirm whether or not the user is located at the venue, and (ii) receive user input confirming that the user is located at the venue.

In yet another aspect, the subject matter described in this specification can be embodied in a system for verifying a venue associated with a user location. The system includes a mobile computing device to transmit an estimated geographic location of the mobile computing device in a wireless request, and to receive, in a wireless response to the request, a suggested venue, wherein the suggested venue is displayed as a single suggested venue on a display of the mobile computing device along with a prompt that a user of the mobile computing device confirm whether or not the user is located at the suggested venue. The system includes a location-identification unit to determine the estimated geographic location of the mobile computing device. The system includes a server system to receive the estimated geographic location in the wireless request and return the suggested venue to the mobile computing device in the wireless response.

These and other implementations can optionally include one or more of the following features. Determining the estimated geographic location of the mobile computing device may include determining the estimated geographic location based on receiving signals from one or more wireless beacons. The one or more wireless beacons may be satellites in a global satellite-based geographic location identification system. The one or more wireless beacons may be base station transmitting antennas in a ground-based wireless communication network. Wirelessly transmitting the estimated geographic location may include transmitting an estimated latitude and longitude to the server system. The interface element may be an only interface element that indicates that the mobile computing device may be at a venue. The display may include a prompt requesting the user to confirm that the user is at the suggested venue. The interface element that indicates that the mobile computing device may be at the suggested venue may include the prompt requesting that the user confirm that the user is at the suggested venue. In response to receiving the user input confirming that the user is at the suggested location, the prompt may be removed from the display so that the suggested location is displayed as a confirmed location. A secondary interface element that invokes, upon user selection, a display of additional suggested venues may be provided on the display. Prior to the display of the secondary interface element, the display may not include other venues displayed concurrently with the suggested venue. The display may include a touchscreen display device. Receiving the user input may include receiving physical contact of a region of the touchscreen that corresponds to the display of the interface element. The provided wireless communication may be a user-submitted post that is broadcast to a group of people that have agreed to subscribe to posts authored by the user. The user-submitted post may include a user-defined textual post and the confirmed location. A plurality of identifications of suggested venues may be received at the mobile computing device and from the server system. The suggested venue may be one of the plurality. The plurality of suggested venues may be ranked. A most prominently ranked venue of the plurality may be determined at the mobile computing device to be geographically located within a predetermined threshold distance of the estimated geographic location of the mobile computing device. The most prominently ranked venue may be assigned as the suggested venue.

The server system may determine the suggested venue based on (i) the estimated geographic location, and (ii) a history of receiving user confirmations that the mobile computing device is at the venue. The server system may determine the suggested venue based on (i) the estimated geographic location, and (ii) a history of receiving user confirmations that other mobile computing devices are at the venue. The server system may determine the suggested venue based on (i) the estimated geographic location, and (ii) a popularity of a search result that corresponds to the venue as a result to a query in a search engine. The server system may return a list of ranked suggested venues to the mobile computing device in the wireless response. The mobile computing device may determine that a most-prominently ranked venue is farther than a threshold distance away from the estimated geographic location. The mobile computing device may determine that a next most-prominently ranked venue is within the threshold distance away from the estimated geographic location. In response, the mobile computing device may identify the next most-prominently ranked venue as the suggested venue.

In general, one aspect of the subject matter described in this specification can be embodied in a computer-implemented method for switching between location contexts on a mobile computing device. An estimated geographic location of the mobile computing device is determined by a mobile computing device. A user-identified location is received from an application program invoked on the mobile computing device. The estimated geographic location and the user-identified location are concurrently stored in computer-readable memory. One of the concurrently-stored locations is identified as a current location. A plurality of interface elements that each identify a venue that is geographically near the current location are presented on a display of the mobile computing device. User input that changes the current location from one to the other of the concurrently-stored locations is received at the mobile computing device.

Another aspect of the subject matter described in this specification can be embodied in a system for switching between location contexts on a mobile computing device. The system includes a location identification unit to determine an estimated geographic location of the mobile computing device, the location identification unit estimating the location based on wireless signals received from electronic beacons. The system includes an application program to receive user-input identifying a location. The system includes a current location identification unit to (i) concurrently store in computer-readable memory the estimated geographic location and the user-identified location, and (ii) identify one of the estimated geographic location and user-identified location as a current location. The system includes a server system to receive from the mobile computing device the current location and to provide to the mobile computing device a list of venues that the server system identifies relevant to the current location. The system includes a display device to display (i) an indication of the current location, (ii) indications of the venues that are relevant to the current location, and (iii) an interface element for changing the current location to the other of the estimated geographic location and user-identified location.

In yet another aspect, the subject matter described in this specification can be embodied in a system for switching between location contexts on a mobile computing device. The system includes a location identification unit to determine an estimated geographic location of the mobile computing device. The system includes an application program to receive user-input identifying a location. The system includes means to toggle a context of the mobile computing device between the estimated geographic location and the user-identified location so that a list of venues that are relevant to the presently-toggled context are displayed. The system includes a display device to display an indication of the current location and a list of venues that are relevant to the current location.

These and other implementations can optionally include one or more of the following features. determining the estimated geographic location of the mobile computing device may include determining the estimated geographic location based on receiving signals from one or more wireless beacons. The one or more wireless beacons may be satellites in a global satellite-based location identification system. Determining the estimated geographic location of the mobile computing device may include determining the estimated geographic location based on receiving signals from one or more wireless beacons. The one or more wireless beacons may be base station transmitting antennas in a ground-based wireless communication network. Receiving the user-identified location includes receiving user-selection of a geographic location on a map presented on a display of the mobile computing device. Receiving the user-identified location may include receiving user-selection of a search result that is presented on a display of the mobile computing device in response to a user-provided search engine query. Receiving the user-identified location may include receiving latitude and longitude coordinates from the application program. The current location may be provided from the mobile computing device to a server system. A plurality of venues that are geographically located near the current location may be received at the mobile computing device and from the server system. The plurality of venues may correspond to the plurality of presented interface elements. A graphical interface element that identifies the current location may be presented on the display. A graphical interface element that, when selected by a user, invokes the current location to change to the other of the concurrently-stored locations may be presented on the display. The current location may be changed with single-user input action. The interface element that invokes the current location to change may include an identification of the other location. A graphical interface element that identifies the estimated geographic location, as either the graphical interface element that identifies the current location or the graphical interface element that identifies the other location, may update to identify a newly estimated geographic location as subsequent determinations of the estimated geographic location are performed. In addition to the graphical interface element that identifies the current location, the display may not include more than a single one graphical interface element that identifies a location, where the single one graphical interface element corresponds to the other of the concurrently-stored locations. The single one graphical interface element may include an identification of the other location and may be the interface element that changes the current location. Selection of an interface element that identifies a venue may invoke a display of information about the venue. Selection of an interface element that identifies a venue may assign the venue as the user-identified location. User-input that invokes the application program may be received. User-input that identifies, in the invoked application program, a new user-identified location may be received. The new user-identified location may be received from the application program. The user-identified location may be replaced with the new user-identified location as one of the concurrently stored locations. A single interface element may be presented on the display. Repeated user-selection of the single interface element may alternate which of the concurrently stored locations is the current location. A list of vertically stacked interface elements may be presented on the display. The list of vertically stacked interface elements may include: (i) an interface element displaying the current geographic location, (ii) the plurality of interface elements that each identify a venue, (iii) an interface element for invoking an application program to select the user-identified location, and (iv) an interface element displaying the user-identified location. The display may not include interface elements that identify venues and that are placed to either side of the vertically stacked interface elements.

Particular embodiments can be implemented, in certain instances, to realize one or more of the following advantages. An application telephone can present to a user of the telephone a single suggested venue and prompt the user to confirm the single suggested venue, potentially increasing the likelihood that the user selects a venue, eliminating user-input actions to pull up a list of venues and select one, and reducing screen real-estate used to suggest venues to the user. A single suggestion of a venue may not merely be more convenient than selecting a venue from a list, the single venue suggestion may be more engaging to a user and increase the amount of location-identification information available in a messaging service. The single venue suggestion may appear in a view of a graphical interface that allows a user to perform other actions. For example, with a single action user input (e.g., a single tap or swipe of a touchscreen) a user may be able to invoke a text editor for composing a message, post the message, switch a setting for the messaging application, or confirm a current location of the user. Thus, the user may be more willing to post his location because a separate "location selection" interface view need not be navigated to in order to select a location. As a result, a messaging application that can identify a location of posting users may include more message or user location identification information. Displaying a prompt along with a single suggested venue inside of an interface element can increase a likelihood that a user may tap the interface element before composing a post.

An application telephone can enable a user to switch location "contexts" of the application telephone between an estimated geographic location of the mobile telephone and another location that the user identifies. Concurrent storing and display of both locations enables quick switching of contexts and modification of display of venues that are associated with a current context. Each location context may be associated with a set of information (e.g., a list of nearby places) that may be stored in memory regardless of which context is presently invoked. Thus, a user may be able to toggle between contexts without a computing device fetching additional context information from a server system.

The details of one or more embodiments are set forth in the accompanying drawings and the description below. Other features, objects, and advantages will be apparent from the description and drawings, and from the claims.

DESCRIPTION OF DRAWINGS

FIGS. 2A-2E illustrate a selection of a location of the mobile device.

Like reference symbols in the various drawings indicate like elements.

DETAILED DESCRIPTION

Figure 1B:
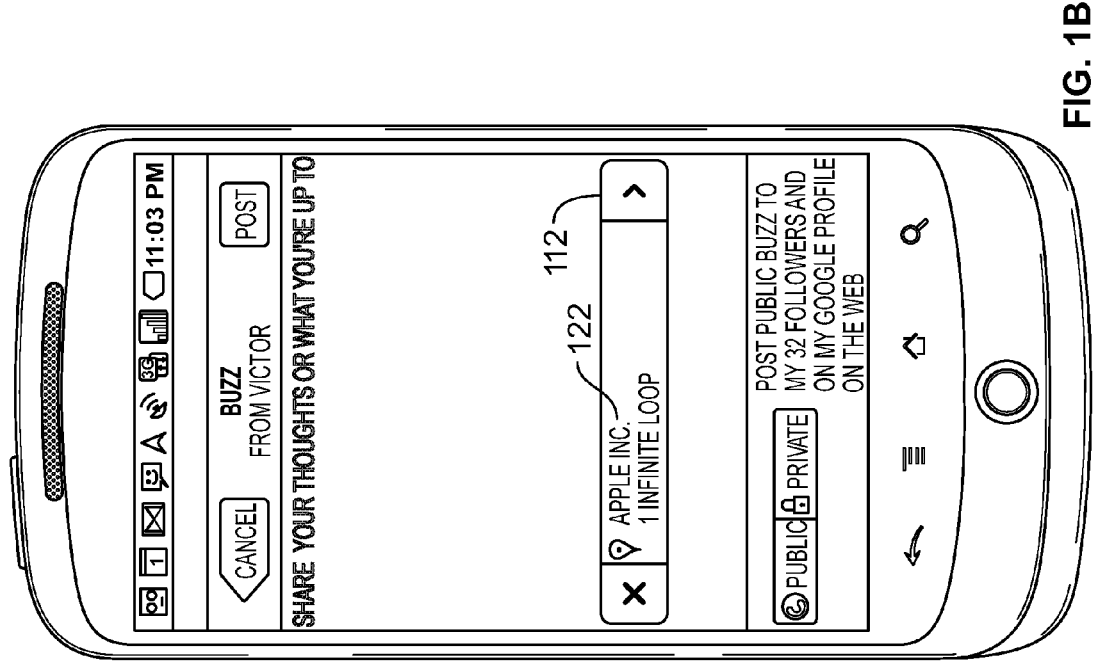
FIGS. 1A-1B illustrate a presentation and selection of a suggested location of a mobile device running a micro-blogging application.

This document generally describes determining a suggested venue of user location, receiving user verification of the suggested venue, and switching between location contexts. The venue may represent a particular map point, boundary, landmark, business, event, geocache site, city, country, or other area of interest to one or more users. The venue can be determined by a mobile device in communication with a server system and verified by a user of the mobile device to ensure the venue is properly associated with the user's preferred location. For example, the user's preferred location may pertain to a location from which the user wishes to author and upload communication content. The user may wish to provide a meaningful or a preferred "upload venue" to, for example, indicate to content readers that he is blogging, texting, or otherwise uploading communication content from his mobile device at a current location. The current location may relate to an actual geographic location or a user-influenced selected location.

A user of a mobile device can open an application program, such as a web browser, a chatting application, a blogging application, a micro-blogging application, etc., to upload communication content. Upon opening the single application, the mobile device may suggest a venue by determining any or all of the user's actual geographic location, a user's approximate geographic location, a previous user-selected location, a popular location, or an online user-voted location, just to name a few examples. In some examples, a location-aware application on the mobile device can detect specific user location information and deduce a possible preferred upload venue from the user's actual location. The mobile device can, in effect, recommend to the user a single venue as a selectable upload venue within the graphical user interface (GUI) of the open micro-blogging application, for example. Upon providing the venue or location recommendation, or concurrent with providing the recommendation, the mobile device may prompt the user to confirm the location. For example, the mobile device may determine an approximate geographic location of the user and determine, in cooperation with a computerized server system, a suggested venue at which the user (and the mobile device) may be located. The user can confirm the recommended venue and any post or uploaded communication content associated with the confirmed venue may provide the venue (e.g., data identifying the venue) in the communication content when posted.

The mobile device can additionally provide the user with the capability of switching between particular preferred locations, which can modify device location information pertaining to any or all location-aware applications within the mobile device, regardless of the actual geographic location of the mobile device. For example, the user may identify either (i) a preferred location, or (ii) the user's current geographic location for posting content for other users to view. In some implementations, switching between particular preferred locations may simply modify the device location information associated with a single open application. For example, a user can select a location and that location may be associated with each post initiating from a micro-blogging application.

In effect, the mobile device can allow the user to set a home venue location or another venue location that will be location-stamped on each post corresponding to the user selected location or venue. The mobile device can also use the selected location to retrieve location or venue data for places around the selected location. In some examples, the user may wish to "phantom blog" from a different venue or location than the user's current geographic location. For example, the user may be sitting in a coffee shop near a park and may prefer to attach the park venue rather than the coffee shop venue to any content posted. In this case, the mobile device may allow the user to select a location for stamping a communication in a blog posting or micro-blog posting, for example.

Further, applications on the mobile device may use the selected location as a basis for suggesting other location based information to the mobile device user. For example, if the user is operating the mobile device in Burbank, Calif., and has recently returned from a vacation in New York City, N.Y., the mobile device can provide the user the option to toggle between CA and NY locations when both posting information and searching for other information related to either location. More particularly, if the user is uploading pictures from the NY vacation and discussing venues in the pictures, the mobile device can "guess" that the user wishes to post vacation-related communication and pictures as if the user were still traveling in NY to, for example, ensure the content looks "real time" to readers of the content. This can provide the user an advantage of creating a post or content about the vacation at a time other than when the user is experiencing the events. If the user wishes to have posts stamped with the CA location, the mobile device can provide that option as well, thereby allowing the user to toggle between both locations for posting.

Figure 1A:
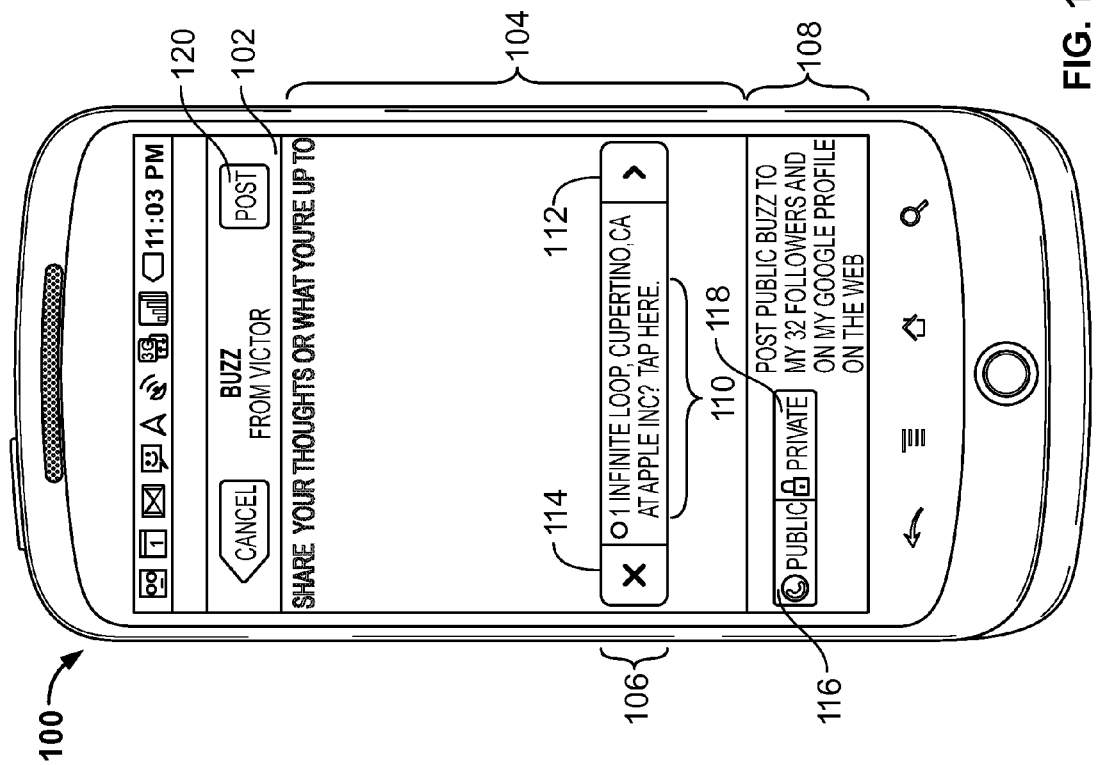

FIGS. 1A-1B illustrate a presentation and selection of a suggested location of a mobile device 100 running a micro-blogging application. Using the micro-blogging application on the mobile device 100 may require a user to register the micro-blogging application with a micro-blogging service. Once registered, the user can begin posting content using the micro-blogging application on the mobile device 100. One example registration process may include establishing a user ID and password such that secure access to the micro-blogging application can be provided. Once established by the micro-blogging service, the application may enable the user to log into an online blogging account and begin posting content for other users who may read and respond to the content. In some implementations, the user ID and password may pertain to a previously established email account, which may allow the user to begin using the micro-blogging application without direct registration if, for example, an email program were to integrate the micro-blogging application.

The user may use the mobile device 100 to submit content to a micro-blogging service or other web service. The submitted content can be posted to a website, sent in email, a text message, a voice message, a video message, or otherwise provided in an online manner to one or more users. For example, a user can open a micro-blogging program such as a "Buzz" application 102 shown in FIG. 1A, or another blogging or micro-blogging application and enter content for online submission.

The application 102 may include input fields and controls for a user to enter textual posts and access other online and offline information. In one example, the application 102 includes a text area 104, a prompt area 106, and a post configuration area 108. The text area 104 provides a text editor that users can access to post content about ideas, news, events, conversation, opinions, or other musings. In some examples, a post entered in area 104 may be associated with a location of the user's mobile device at the time of post creation. For example, the user may opt to associate a location with their post including a latitude and longitude, current city or geographic region, commercial business, or venue and display the associated location as a venue of posting.

The prompt area 106 represents a toolbar with a single location. The location may represent a venue selected by the mobile device 100 using a GPS secured location, a cellular service secured location, a triangulated location, a nearby location, a previously entered location, a popular location within a particular range of the user, or any combination of the above, for example.

The prompt area 106 may provide the user with a prompt 110 for selecting displayed location information. For example, the prompt area 106 includes an address, "1 Infinite Loop, Cupertino, Calif." and a prompt 110 "At Apple Inc? Tap here" that the user can select. The prompt 110 may provide an estimated guess of a user's location with directions or prompting for the user to select an associated location or name of the address. For example, if the user's geographic location is near "1 Infinite Loop, Cupertino, Calif.," the mobile device 100 may use location data to infer that the user wishes to provide a posting from the venue "Apple, Inc." and may prompt the user to select Apple, Inc. using the question mark and the "Tap here" language.

In the depicted example in FIG. 1A, the prompt area 106 is a floating toolbar where the user can select a location for posting user-entered content. In some implementations, the prompt area 106 may be a toolbar which appears from a corner panel, a side panel, or a menu pop-up screen. In some implementations, the prompt area 106 may simply display a single location until a user hovers over the area 106, at which point the prompt 110 may appear. In some implementations, the prompt area 106 may be a docked tool bar or a menu item.

The prompt area 106 may be provided as a single toolbar or graphic element within the micro-blogging application. This can provide a user of the micro-blogging application with a non-intrusive element in the micro-blogging user interface. In some examples, the toolbar may be provided upon hover over a graphic, a link, a menu item, a post, or other element within the micro-blogging application.

The prompt area 106 also includes a scroll control 112 to enable a user to scroll multiple selectable locations for posting. For example, if a user selects the scroll control 112, another single location may be provided to the user in place of the Apple, Inc. location. The next location may be another "guessed" location of a venue, according to known user location or user entered data. For example, the next location may be a popular venue close to Apple, Inc, such as a coffee shop, a park, a mall, or other venue. In some implementations, the prompt area 106 may provide a single suggested venue and may not display other selectable venue options. In some implementations, the prompt area 106 may provide multiple address options, but only provide the prompt 110 on the first option.

Any number of locations may be scrollable using scroll control 112. Providing a single location within prompt area 106 may provide the advantage of displaying a small or shrunken control for selecting locations since the user may be accessing the micro-blogging application on a portable device with a small display window. At some point, the user may close prompt area 106 by selecting a close control 114. Other mechanisms may be available to close the area 106. For example, the user may swipe (e.g., side-to-side or top-to-bottom motion) the prompt area 106 off of the screen using a fingertip or stylus to do so.

The post configuration area 108 may include configuration options for the user to configure post content and post attributes. For example, area 108 provides the user an option to make a post public or private by selecting either a public control 116 or a private control 118, respectively.

In operation, users can open application 102, enter content in text area 104, and select a presented location from prompt area 106. The user can then select a post control 120 to submit the entered content as a post entered from the user-selected location of posting. The posts may be transmitted from the mobile device to a central server where the content is disseminated to computing devices of other people. These other people may view the posts by using the same micro-blogging application, using email, or using another application, or by logging into a website that displays a stream of posts by other people that use the micro-blogging service.

Upon selecting a presented location and the prompt 110, the micro-blogging application may display a selected location 122 in the toolbar 106, as shown in FIG. 1B. The prompt 110 and the address may disappear. In this example, the selected location 122 may be associated with user content that the user enters as a post. If the user desires to change the location after selecting a location in prompt area 106, the user can select the scroll control 112 to view other location options one at a time within area 106.

If the user does not wish to be associated with a location, the user can close the toolbar 106 and continue posting without a location. In some implementations, the application defaults to a user's GPS triangulated location upon the closing of toolbar 106.

FIGS. 2A-2E illustrate a selection of a location of the mobile device 100. The content shown in FIGS. 2A-2E may be presented on a touch screen enabled device or other device capable of displaying content and receiving user input.

Figure 2B:
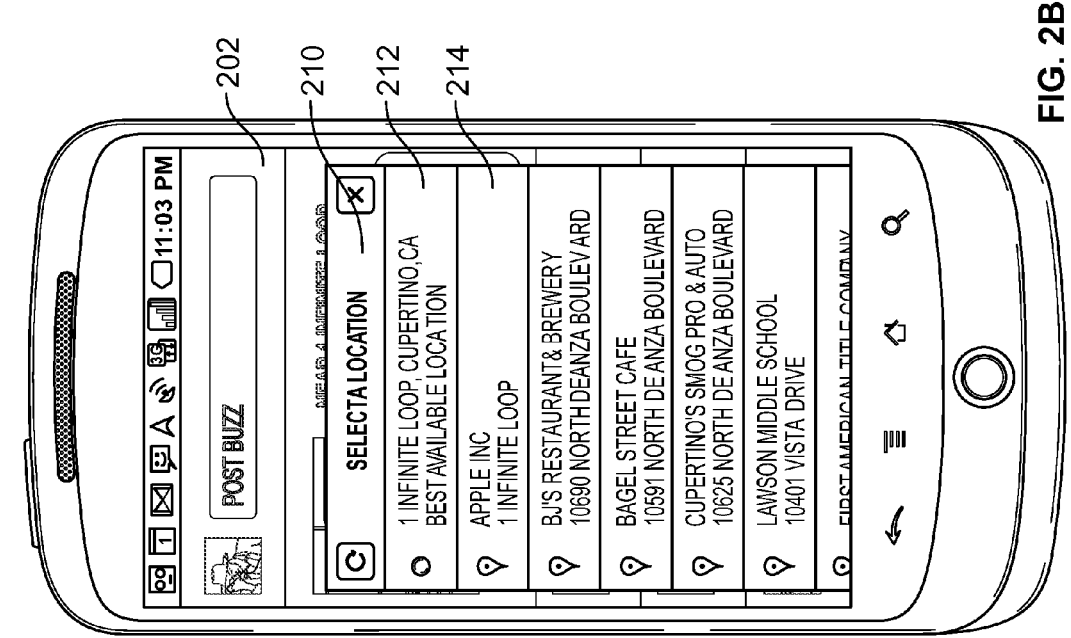
Figure 2A:
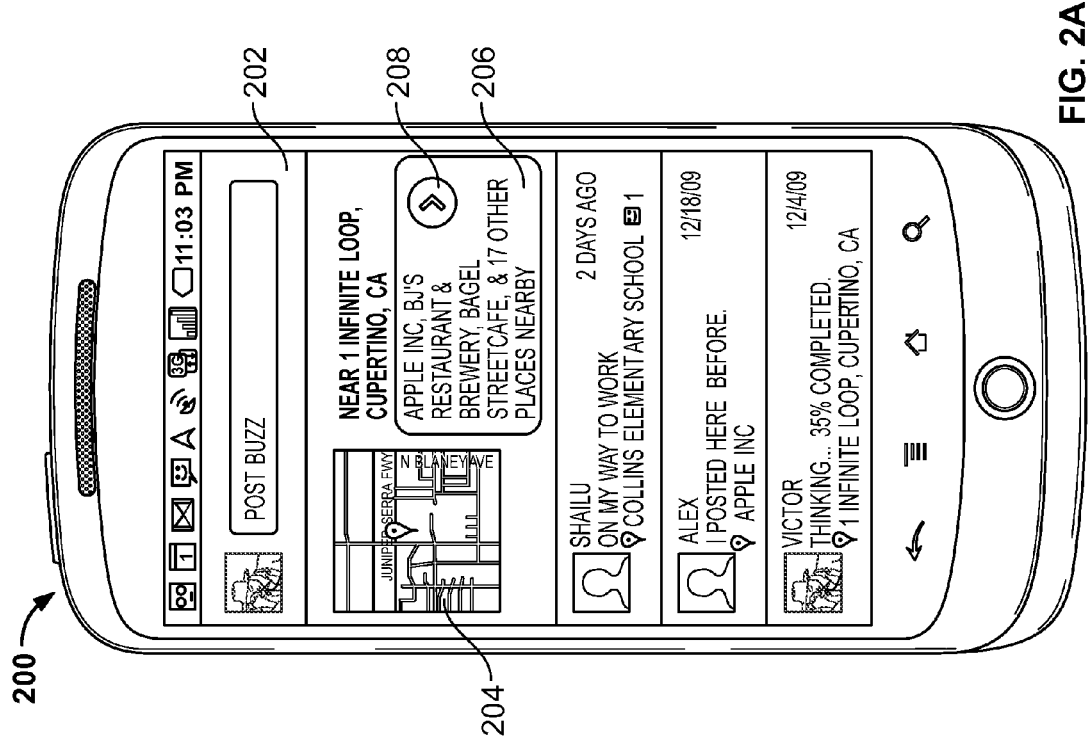

FIG. 2A shows an example display of an environment 200 in which a user can access a micro-blogging application 202. The depicted application screen details one of several possible screens within micro-blogging application 202 and users can switch seamlessly between screens by selecting interface elements using any combination of taps, slides, menu selections, etc. In this example, several users have posted content for a user to view. For example, user "Shailu Chauhan" posted "On my way to work" from a venue named, "Collins Elementary School." The user accessing the application 202 is shown a map 204 with his current geographic location and a list of venues in toolbar 206 near his current geographic location.

As shown, the user is near the street address "1 Infinite Loop, Cupertino, Calif.," which the mobile device may have retrieved from the device location system, for example, in conjunction with communication with a server system. If the user selected the CA address in a previous screen, the venue may be noted as "Apple, Inc." instead of the full address. The user can click on the toolbar 206 to view more information about the venues and/or locations in the list. For example, the user can select a control 208 to view the user's current location combined with other nearby location information, as shown in FIG. 2B.

FIG. 2B shows the micro-blogging application 202 with an overlaid extended toolbar 210. The toolbar 210 shows the user's current geographic location 212, an optional user-selected location 214, and other locations near the user's geographic location.

In some implementations, a mobile device running application 202 can receive location data by initiating a webpage of a mapping site. In some implementations, the running application 202 can initiate another application to determine location data. If the application 202 initiates a mapping application, messages can be sent between the application 202 and the mapping application to, for example, narrow down a list of locations to a single location. In this fashion, the mapping application can send GPS coordinates or latitude and longitude coordinates to the application 202. The application can use the received coordinates as a basis for finding other venues. Other data can be sent between applications to determine an appropriate location suggestion for application 202.

FIG. 2C shows the micro-blogging application 202 with the toolbar 210. The toolbar 210 can be used to allow the user to jump between two location contexts in the same interface. Here, the user is provided with even more locations around the user's current geographic location. The user can select any of the locations in FIG. 2B or 2C to set a selected location 216.

In the depicted example of FIG. 2C, no location has been selected and thus, the selected location 216 is "none," as shown in field 218.

In this illustration, the user can select a "view buzz on a map" tool 220 to pan and zoom to find a location from which to post content. Upon selecting the map tool 220, a map can be presented and the user can use the map to select a location. In addition, the user can search for a nearby place using search tool 222. The map or search tool 222 can be used to select a location. For example, the user can select a location on the map, and the application will return to the toolbar 210 with the selected location. The toolbar 210 may then display the user's selected location in field 218.

Upon selecting a location, the context of the location is changed and accordingly, searches or content entered into the application 202 may be performed in the context of the newly selected location. In addition, other locations listed with the selected location may be associated with the new context. In other words, upon selecting a new location context, the application 202 can repopulate other locations with locations that are near or within a specific range of the newly selected location. For example, all the locations that are displayed between the user's current geographic location interface element 212 and the user's selected location interface element 218 may be associated with one of the locations 218 or 212, depending on which location context is invoked.

FIG. 2D shows the toolbar 210 with a user selected location 224 at a top of the toolbar 210 (e.g., indicating that a current context of the application program is associated with the user selected location 224). The other locations are now shown as having the location context of the user-selected location 224. The user can select another location in the list to view information about that location. In some implementations, the user can choose to promote one of the locations in the list to his selected location.

In operation of the micro-blogging application, the user can switch between a selected location and a geographic location which can, for example, change the context that the mobile device uses to associate location information to application content, such as micro-blogging posts. If the user wishes to switch from the selected location to a geographic location, the user can simply select the geographic location from the list of locations. Similarly, if the user would prefer to use another location, the user can select any other location in the list to set his selected location 224. In some implementations, the user can open the map tool 220 to find other locations to set as a selected location.

In general, the application 202 enables the user to store two distinct location contexts with which to associate to particular applications. For example, the micro-blogging application 202 may be associated with a selected location while a browser window may be associated with a geographic location. As such, when the user posts using the micro-blogging application, the location associated and possibly displayed with the posts may be his selected location. When the user performs search queries for nearby restaurants in the browser, the geographic location may be used.

Figure 2E:
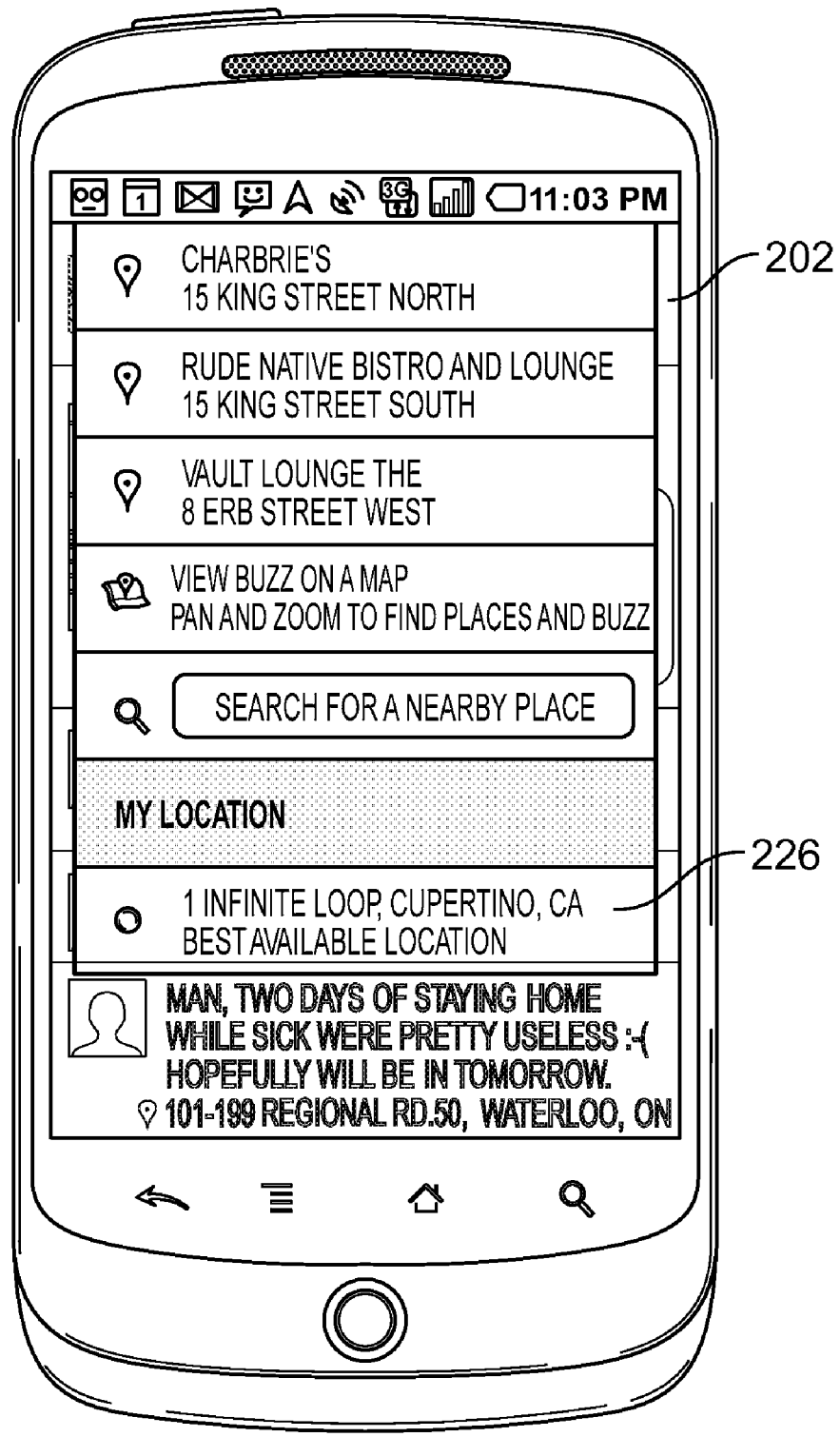

FIG. 2E shows the toolbar 210 with the user's current geographic location 226 is unselected. Here, the user's selected location is used by the application 202 as a present location context rather than the geographic location 226. If the user prefers using the geographic location, the user can select the geographic location 226 to do so. In this case, the geographic location 226 may move to the top of the list of locations, while the selected location (e.g., location 224) moves to the bottom of the list. Accordingly, at any point when a user modifies a preferred location, the list of locations in-between a geographic location and a selected location may automatically change to accommodate the new location context. Namely, the new locations provided are nearby or associated with the preferred location, where the preferred location changes according to user input.

As an example, if a user is waiting to board a train traveling from his current location (e.g., Cupertino, Calif.) to Waterloo, ON, the user can be surfing the web and/or posting content as if the user were actually in Waterloo, ON at the time of surfing and posting. Here, the user can find nearby venues from the new location (e.g., Waterloo, ON) without having to be at the selected location. In operation, the user can open a map, select Waterloo, ON, and provide a post as if the user were already in Waterloo, ON.

Users can select any location based on interest and modify what the micro-blogging application 202 perceives to be its current location. Therefore, it is possible to phantom post content from a location based on easily selectable locations within an application. In addition, users can post a message from one location and post the next message from a second location without exiting the application or opening another application on the mobile device 100. Upon selecting or changing a location, the user can close the toolbar 210 and continue posting and reading posts within application 202.

The application 202 stores two location contexts, each of which can be selected by the application 202 to suggest nearby venues. Any number of venues may be displayed to the user. Each venue may be ranked and provided to the user in a ranked order.

Figure 3:
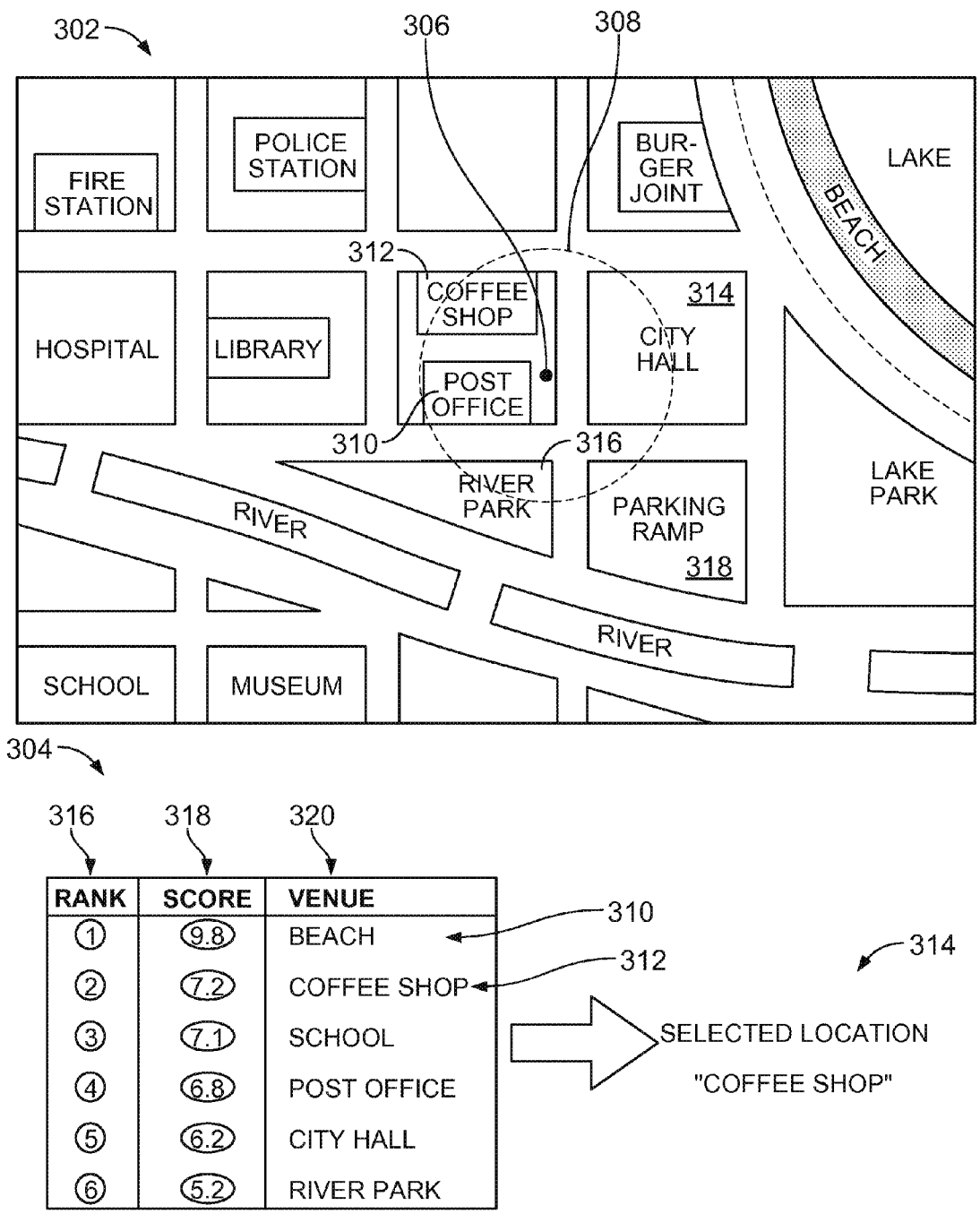
FIG. 3 is an illustration of determining an estimated location for a user.

FIG. 3 is an illustration of determining an estimated location for a user. A mobile device, such as mobile device 100 can be used to estimate the location of a user. In this example, a map 302 and a list of venues 304 is provided to the user. The map 302 depicts a user location 306 and an accuracy range 308. Here, the user is physically located near a post office 310, a coffee shop 312, a city hall 314, a river park 316, and a parking ramp 318. As the user travels around streets and buildings, the mobile device 100 can track the user and modify the surroundings and viewpoints on the map 302. For example, as the user travels, several locations may come into view and other locations may go out of view.

The accuracy range 308 may provide a threshold for which venues to provide and/or associate as "nearby" venues. For example, if a particular venue were out of range of the accuracy range 308, the mobile device 100 may not suggest the out of range venue as a selectable option.

The list of venues 304 includes a number of venues which are ranked and scored. The venues may be ranked and scored by a backend server (e.g., search engine server) using input from the mobile device, input from users, input from online traffic, or other metric. In some examples, the server can rank locations according to popularity among other micro-bloggers. For example, if a high percentage of users are posting content from a park location, the server may detect this and rank the park location higher than a river location, for example.

The scoring mechanisms can be performed by the mobile device 100, an online server, or other entity with access to user data and mobile device data. In some implementations, the scoring can incorporate signals from the mobile device 100 and other users to determine a weighted combination of scores. In some implementations, previously stored user data can be retrieved to determine suggested locations.

Upon ranking available venues, the server can provide the mobile device 100 with a list of venues in a ranked order. In the depicted example, a beach venue 310 is ranked first. Here, the ranking may have been based on popularity of venues, if for example, several users were utilizing the beach 310 to post content or simply selecting the beach as their "phantom" location. The next highest ranked venue is a coffee shop 312 and other venues are ranked accordingly.

The mobile device 100 can analyze the ranked list of venues 316 and determine which venue is most likely to be an accurate location guess. For example, the mobile device 100 can determine that the number one ranked beach venue 310 is outside of the user's accuracy range 308 and as such, the micro-blogging application may instead suggest the coffee shop venue 312 as the selected location 314, as shown by the selected location 314. The selected location 314 can be presented to the user in an interface, such as toolbar 106.

In some examples, the scores 318 are not transmitted to the mobile device 100 to ensure that a user of the mobile device 100 is unable to determine how the server system scores the venues 320. As described above, the mobile device may display a single suggested venue in the toolbar 106. Upon selection of the control 112, or upon selection of the control 208, a list of venues may be displayed in a toolbar (e.g., a pop up toolbar that may be similar to the toolbar in FIG. 2B, but may not be associated with two separate location "contexts").

Figure 4:
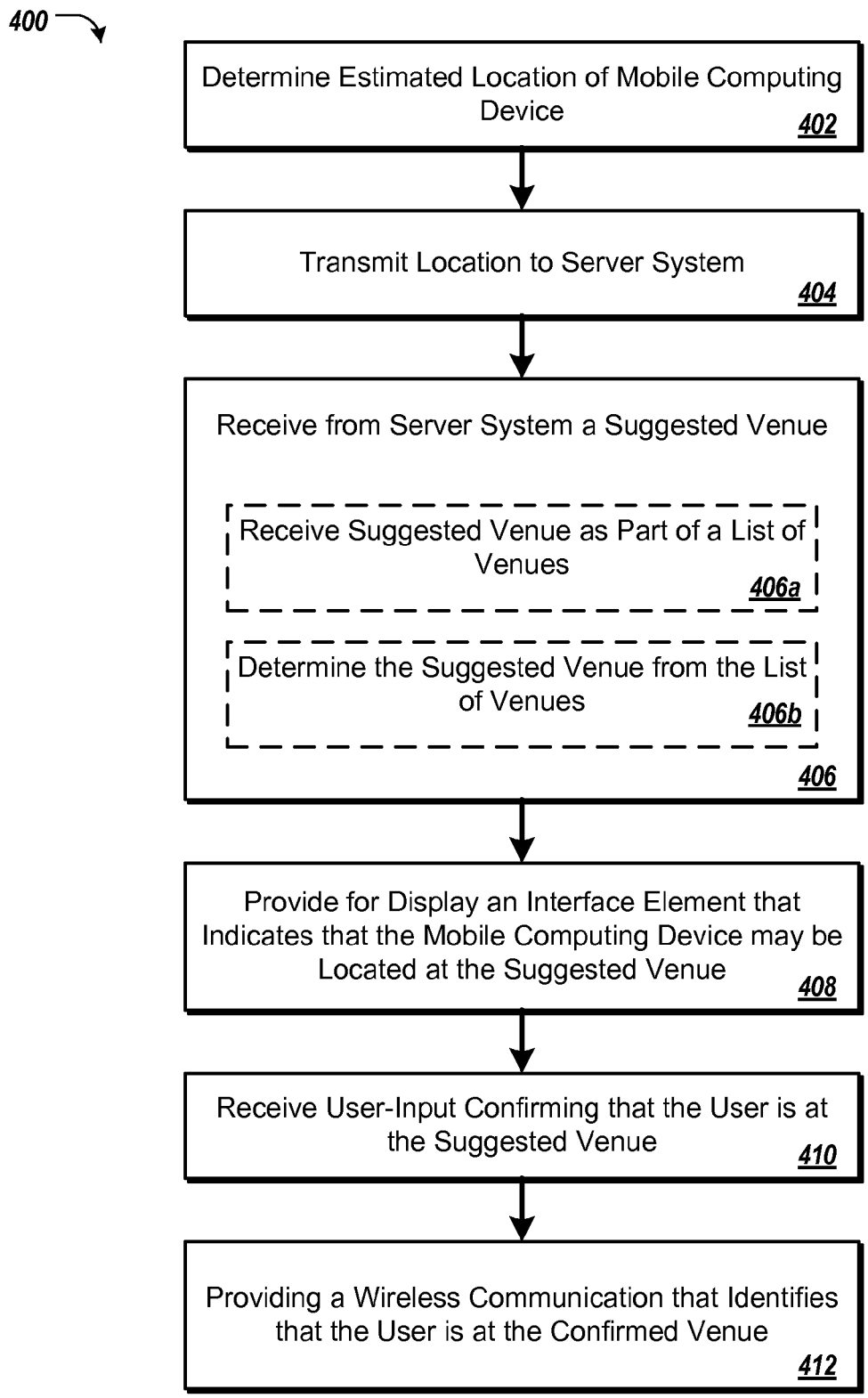
FIG. 4 is a flowchart of an example process for verifying a venue associated with a user location.

FIG. 4 is a flowchart of an example process 400 for verifying a venue associated with a user location. The process 400 can be performed, for example, by systems such as those described in association with FIGS. 1, 2A-2E, and 6.

In box 402, an estimated location of a mobile computing device is determined. In one example, the estimated location of the mobile computing device can be determined by the device itself. The estimated location may pertain to a geographic location of the mobile computing device. For example, the mobile device may employ GPS signals, cellular signals, or other location tracking signals with time stamps and coordinates to determine its location.

In box 404, the determined location is transmitted to a server system. For example, the mobile device 100 can send its location information to a micro-blogging server system.

In box 406, a suggested venue is received from the server system. The suggested venue can be determined by the server system. The server system can determine a list of venues and send a single venue or a ranked list of venues without a score, for example. In optional box 406a, the suggested venue is received as part of a list of venues. In optional box 406b, the venue is determined from the list of venues. For example, the mobile device 100 can use a first venue in the list as the suggested venue, or select another venue in the list based on other criteria.

In box 408, an interface element that indicates that the mobile computing device may be located at the suggested venue is provided for display. For example, the mobile device 100 can display the suggested venue in the prompt area 106.

In box 410, user input confirming that the user is at the suggested venue is received. For example, the mobile device 100 can receive a user input indicating that the user is indeed at the suggested location (e.g., by tapping the prompt area 106). In some implementations, the user can confirm location based on the desire to be perceived as located at the suggested venue. For example, the user may wish to have content location-stamped with the suggested venue upon posting content in the micro-blogging application.

In box 412, a wireless communication that identifies that the user is at the confirmed venue is provided. Here, the wireless communication is sent as a post by the user and the suggested venue is attached and displayed as an attribute of the post.

Figure 5:
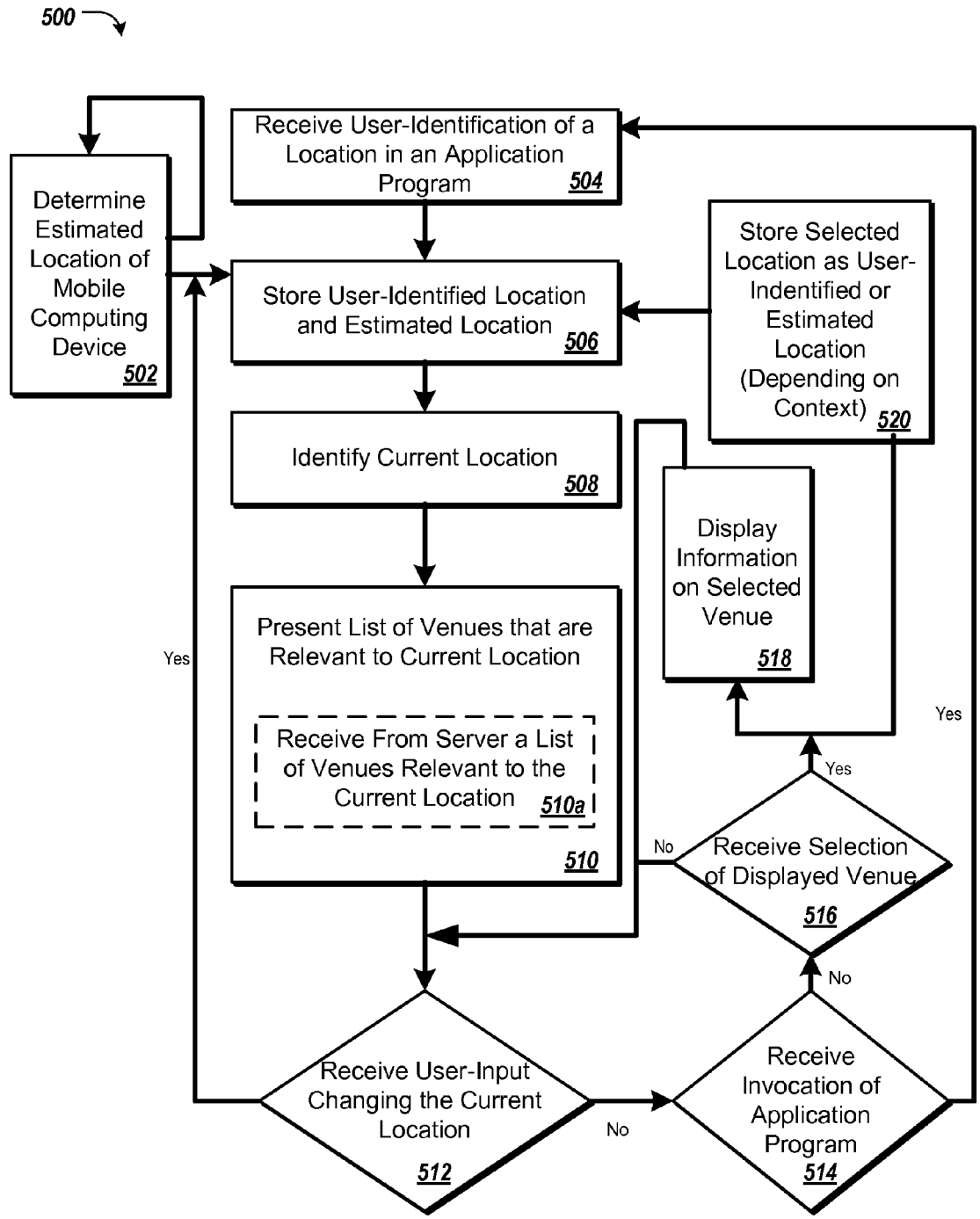
FIG. 5 is a flowchart of an example process for switching between location contexts on a mobile device.

FIG. 5 is a flowchart of an example process 500 for switching between location contexts on a mobile device. In general, the process 500 can determine a location context or receive a location context from another source. For example, the process 500 may receive location context data from a user, a website, a GPS signal, a cellular service, an application, or another input. The process 500 can be performed, for example, by systems such as those described in association with FIGS. 1, 2A-2E, and 6.

In box 502, an estimated location of a mobile computing device is determined. The estimated location of the mobile computing device can be determined by the device itself. The estimated location may pertain to a geographic location of the mobile computing device. For example, the mobile device may employ GPS signals, cellular signals, or other location tracking signals with time stamps and coordinates to determine its location.

In box 504, user identification of a location in an application program is received. For example, an application program invoked on the mobile computing device 100 may identify a location of the user. The location can be identified by a user with mapping and searching applications (e.g., applications invoked by interface elements 220 and 222).

In box 506, a user identified location and the estimated location are stored. For example, the micro-blogging application 202 can concurrently store both the user identified location and the estimated location on the mobile device 100 or an online server device, or both. In some implementations, not only are both locations concurrently stored, but information that is relevant to both locations is stored as well. For example, a list of venues that are associated with each location may be stored in memory, along with information for each of the venues (e.g., hours of operation, a website link, user reviews, pictures, a location, etc.).

In box 508, the current location is identified. For example, the application is storing the estimated geographic location and the user identified location in the mobile device 100. The application can identify one location from the two locations. In one example, if a micro-blogging application is simply opened, the default location may be the geographic location estimated by the global positioning system. Accordingly, the application may identify the user selected location as the user's current location. In another example, if the micro-blogging application is opened from a mapping application, the default location may be the user-selected location. Accordingly, the application may identify the user-selected location as the user's current location.

In box 510, a list of venues relevant to one or more current locations is presented. The list of venues may be near the current location or within a particular range of the current location. The list of venues may be the venues illustrated between the top and bottom best available location 212 and selected location 218. In optional box 510a, a list of venues relevant to the current location is received from a server. For example, a list of ranked venues may be received from a search engine server. The ranking may pertain to popular venues, user interests, nearby venues, or other ranking factor.

In some examples, a ranked list of venues for the other location (e.g., the estimated geographical or selected location that is not the current location) is retrieved from a server system and stored in memory. Thus, a computing device may be able to receive user input switching a current location to the other location, and in response, present a list of locations that are relevant to the new current location without querying a server system. Stated differently, a computing device may store all the information necessary to switch location contexts in response to user input switching the context from one location to another.

In box 512, a determination is made about whether or not user input changing the current location is received. For example, a user can select to use a geographic location as the current location (e.g., when the current location is presently a user-selected location). The user input may be a single user input action. For example, the user input may be a single tap of a button or a single tap of the touchscreen or swipe across the touchscreen (e.g., without any additional user-input until the location is changed). If user input is received, the mobile device stores the user identified location and estimated location, as described in relation to box 506. The user identification location and estimated location may already be stored, in some examples.

If user input is not received, in box 514, a determination is made about whether or not an invocation of an application program is received. If a user invokes an application program (e.g., a maps application program that enables the user to choose a new location as the selected location), the mobile device can receive the user-identification of a location in the invoked application program, as described in relation to box 504. If the user does not invoke an application program, in box 516, a determination is made about whether or not a selection of a displayed venue was received. For example, a determination if any of the list of venues in between the best available location 212 and selected location 218 are selected may be performed. If a user does not select a displayed venue, the mobile device can display current information or make another determination about whether or not user input changing the current location is received.

In some implementations, if a user selects a displayed venue, in box 518, information on the selected venue is displayed. For example, the selected value may be displayed with information about the venue (e.g., an address, website, hours of operation, etc.). In some implementations, if a user selects a displayed venue, in box 520, the selected location is stored as the user identified location or the estimated location, depending on the context. For example, if the user selected a new location while the selected location context was invoked, the selected location is stored as the user identified location. Conversely, if the geographic location context is invoked, the selected location is stored as the geographic location. In some implementations, a location selected from a list of venues cannot override the geographic location if the location selected form the list is beyond a threshold distance away from an estimated geographic location (e.g., more than 50 miles). The user can switch between location contexts which may swap order of the locations in the application each time the user switches contexts.

Figure 6:
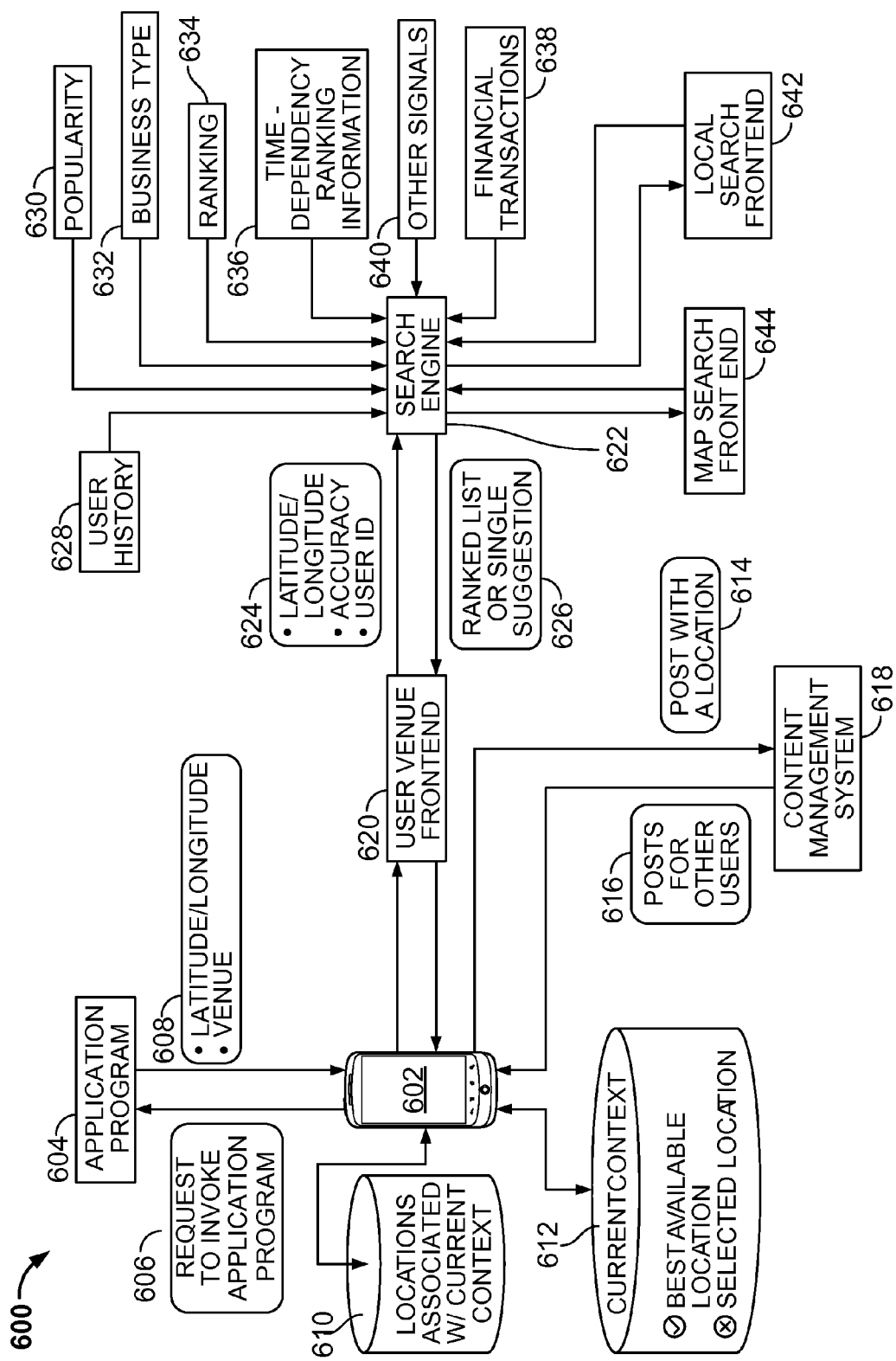
FIG. 6 is a block diagram of an example system for verifying a venue associated with a user location and switching between location contexts on a mobile device.

FIG. 6 is a block diagram of an example system 600 for verifying a venue associated with a user location and switching between location contexts on a mobile device 602. In this example, a user is operating one or more application programs 604 on the mobile device 602. Example application programs may include messaging applications (e.g., TWITTER, FACEBOOK, MYSPACE, LINKED IN, XING, etc.), mapping programs (GOOGLE MAPS, MAPQUEST, proprietary mapping software, etc.), search engines, game programs, email programs, text messaging programs, etc. The mobile device 602 can request 606 to invoke application programs 604 at the request of a user, for example.

The application programs 604 may be executed on the mobile device 602 and may provide location information, user data, and other data to the mobile device 602. For example, the application programs 604 may provide latitude and longitude data and/or venue data 608 to the mobile device 602. An application program 604 may send location or venue data 608 in two different ways. In a first example, one application (e.g., a maps application) "starts" another application (e.g., a micro-blogging application) by loading the other application as a web page, either separately or embedded in the maps application. To start the application, an URL may be provided to the web page browser. The URL may include location context information (e.g., http://www.google.com/application?II=24.12345,-30.9876). In a second example, the other application is loaded by the first one, as described above, but "messages" may be transmitted between both applications. One or more of these messages may include the location or venue data 608.

The mobile device 602 may include a location-identification unit to determine the location of the device and thus the location of the user. The mobile device 602 may include a screen to (i) display a single suggested venue on a display of the mobile computing device with a prompt for a user to confirm whether or not the user is located at the venue, and (ii) receive user input confirming that the user is located at the venue.

The mobile device 602 may also include a screen to display (i) an indication of the current location, (ii) indications of venues that are relevant to the current location, and (iii) an interface element for changing the current location to the other of the estimated geographic location and user-identified location.

The mobile device 602 can store data pertaining to users and user locations. For example, the device 602 may store locations associated with a current location context 610. In another example, the mobile device 602 can store current contexts 612, such as the best available location and a user selected location.

Users can post content using mobile device 602. For example, users can create textual, video, and/or audio content and the device 602 can post the content 614 with a particular location. The location may pertain to current context 612. Users may also consume posts 616 from other users using mobile device 602. In some implementations, a content management system 618 may manage content which is sent and received by each mobile device in use in a social network, for example.

The mobile device 602 can employ a user venue front end 620 to send and receive information to and from a search engine 622. The user venue front end 620 may send information 624 including, but not limited to latitude and longitude data, accuracy data, and user identification data to the search engine 622. The information 624 can be used to properly employ contextual location data selections. In some examples, the information 624 can ensure that the search engine 622 provides users with venue data tailored for each individual user.

The search engine 622 can use various signals to determine and suggest relevant lists of location data to users. The signals may include user history 628, popularity 630, business type 632, ranking 634, time-dependent ranking information 636, financial transactions 638, and other signals 640.

User history signals 628 may represent a history of received user confirmations where users have selected particular locations (either particular to a user of mobile device 602 or generally for multiple users of the micro-blogging service). User history signals 628 may also represent location data for places from which a user often visits or posts content. In some implementations, user history signals 628 may represent a previous location on an ongoing itinerary.

Popularity signals 630 may represent the popularity of a particular location for one or many users in an area. For example, if many users post from the beach and a user is within range of the beach, the server may suggest the beach as a venue for the user within range of the beach. In some implementations, popularity signals 630 may represent a popularity of a search result that corresponds to a venue as a user-selected result of a query in a search engine.

Business type signals 632 may represent the likelihood of a user wanting to post from a particular business type. For example, it may be more likely that a user posting content will post from a coffee shop rather than a fire station even if the fire station is within closer range than the coffee shop. Here, the business type signal 632 would be weighted heavier for the coffee shop than the fire station. In some implementations, the user device 602 provides a business type (e.g., if a user of the device 602 is interested in restaurants and not hotels). The received business type 632 may be used to filter results or select a corpus of information from which to search for responsive venues or locations.

Ranking signals 634 may represent user-supplied rankings for particular venues or locations. For example, users of a micro-blogging application may visit various dinner clubs and rank the dinner clubs on a scale of one to five stars. Venues that are associated with high ratings may be ranked higher in a list of venues. Thus, the higher ranked venues may be weighted more heavily in a generation of the ranked list of venues or single suggested venue 626

Time-dependency ranking information 636 may represent time-dependency data for any of the signals 628 to 640. For example, data may indicate that a particular venue (e.g., a library) has a high user-history of confirmations on Monday through Saturday, but not on Sunday. This data may be used to score the library as a suggested venue more heavily on Monday through Saturday, but not on Sunday. In some examples, the time-dependency data is specific to times of day or periods of the year. For example, the time-dependency data may identify a ski area as particularly popular at nighttime during the winter months.

Financial transaction signals 638 may represent previous user transactions at particular venues. For example, if a user makes a purchase at a restaurant with a registered credit card, a financial trail is created. The mobile device 602 can use this financial trail as a signal to determine user preferred location data. In the example of the restaurant, if a user creates a post at or near the restaurant within twenty minutes of making a purchase at the restaurant, for example, the suggested location may be the restaurant name. In this example, the user can confirm the suggested location without having to sift locations or type in the name of the restaurant. In a similar example, if a user purchases food frequently at a taco stand, but rarely purchases food at a nearby sandwich stand, the search engine 622 may suggest the taco stand over the sandwich stand as a suggested location of posting, all other signals being equivalent.

The search engine 622 can employ a local search front end 642 to retrieve signals for determining relevant lists of location data. The local search front end 642 may retrieve popular venue information near particular locations. In some implementations, search ranking information can be used to rank location venues. The search engine 622 can employ a map search front end 644 to retrieve signals for determining relevant lists of location data. The map search front end 644 may provide map query data entered by users. In some examples, the map search front end 644 or the local search front end 642 provide the ranked list of suggested venues or single suggested venue 622 to the search engine 622, and the signals 628-640 are used by the map or local search front ends 642 and 644 to generate the ranked list or single suggested venue 626.

In operation, the mobile device 602 can send data to the user venue front end 620. The user venue front end 620 can forward the data to the search engine 622. The search engine 622 can perform the operations in FIG. 4 and FIG. 5 to verify a venue associated with a user location and/or to switch between location contexts on the mobile device 602. The search engine 622 can send suggested locations, locations of interest, or switched location information to the user venue front end 620, which can send the information (in a ranked manner) to the mobile device 602 for consumption by the user.

Figure 7:
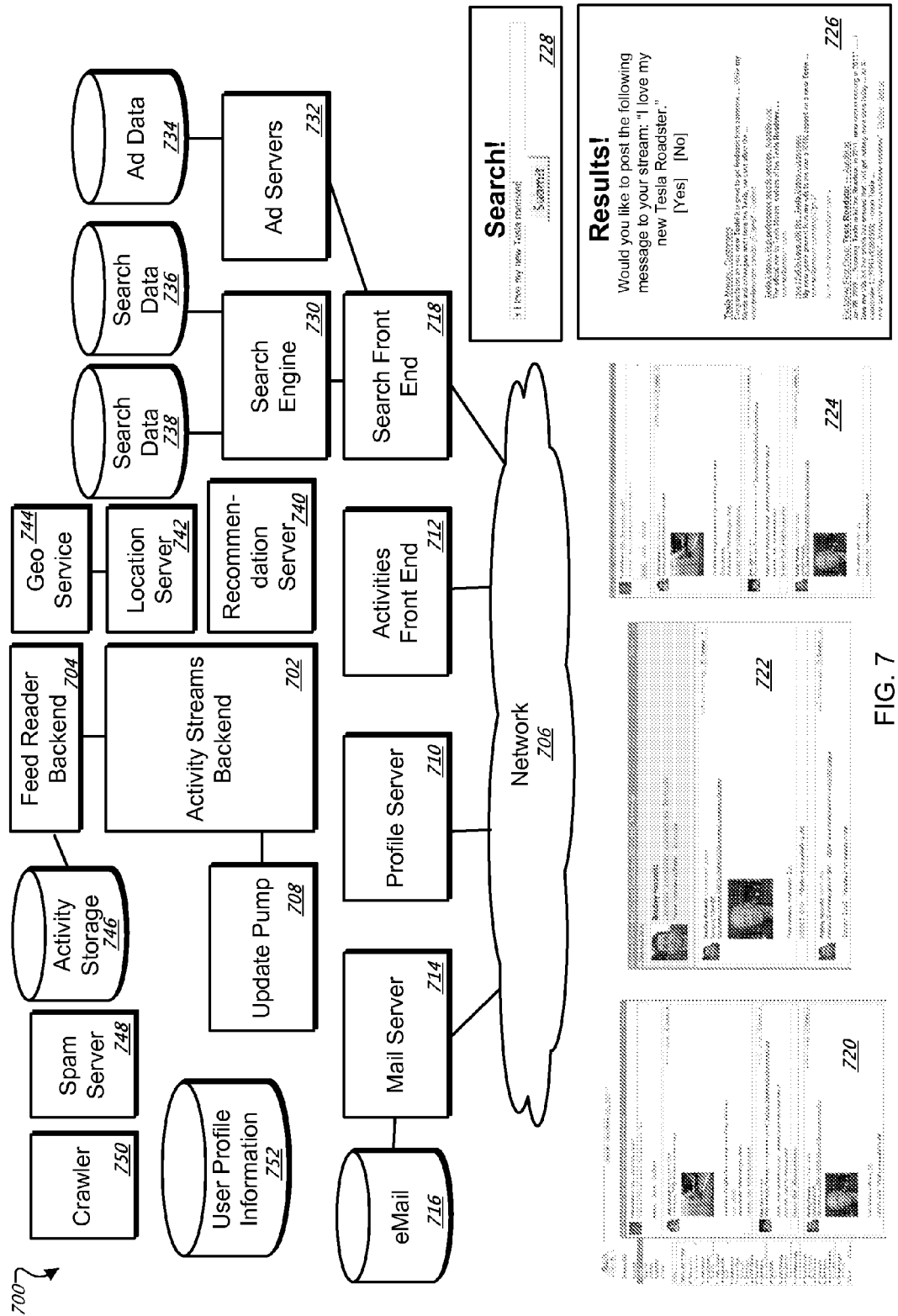
FIG. 7 is a schematic diagram of a system within which the various features described in this document may be implemented.

FIG. 7 is a schematic diagram of a system 700 within which the various features described in this document may be implemented. In general, the system 700 permits various users to post, review, and comment on various activity streams of information, within a social networking framework. For example, a user may make a micro-blogging post about a recent happening in the user's life or about a news article the user recently read. That post may be forwarded to other users who have chosen to follow the first user (who may be an individual or an organization). Those other users may see the post using a stream reader, or the post may be displayed in their email applications (e.g. either in line with their regular email messages or under a separate tab). Those users may choose to comment on the post, and other users may also comment on the post or comment on the comments of other users. Such comments may be included and shown in the various users email application even if they were made after the post was originally connected to the email application. Thus, the various types of feedback may be made available to each user conveniently in one place. Users may also see posts related to other users my visiting profile pages for those other users, and may also go to their own profile pages or to their stream pages to see all of the posts and comments for posts to which they are subscribed.

The various posts, and comments on posts, are managed in the system 700 by an activity streams backend 702, which is in charge of implementing business logic that defines the manner in which various submissions to the system 700 will be handled. The activity streams are characterized by activities, which are the subjects of posts (e.g., micro-blog posts) that users submit to the system 700, and various comments directed toward those activities. For example, a user may post an activity regarding a web page they are currently viewing by pasting a URL of the page into a posting page. Such action may cause the system 700 to gather important information form the URL, including images displayed on the page, headings, labels for images, or topical terms that describe a topic of the page (e.g., as previously determined by analysis of the words on the page, such as using ADSENSE analysis of the page). The system 700 may also obtain location information, such as the current location of the user, and/or a venue with which the user is most currently associated (e.g., that the user checked into recently or identified as a venue in which the user is located).

The activity streams back-end 702 also implements logic for determining what users are to receive posts, comments on posts, and other portions of streams in the system 700. In particular, users who have subscribed to receive posts form other users may be provided with posts when they log into the system 700, users may nominate other users to receive copies of streams when those other users would not ordinarily be included in the streams (e.g., by typing in identifiers for those other users when reviewing a post), and users may send streams directly to each other, among other things.

The feed reader back end 704 manages storage of posts and related data for the system 700. The feed reader back end 704 may rely on various levels of activity storage 746 to store posts, comments, on posts, and other information needed to construct streams for users when they request information from system 700. As with the other components shown in this figure, the feed reader back end 704, though shown as a single block, can be implemented using a number of different servers or server sub-systems Likewise, the activity storage 746 can be implemented across a number of databases and database types, and across a variety of servers and server sub-systems.

When posts or other updates are received by the activity stream back-end 702, they are formatted and provided to update pump 708. The update pump 708 is responsible for provided notices about newly-posted information to various services that may need such information. It acts, in effect, as a router and distributor of information relating to the system 700. For example, a mail server 714 may include functionality for integrating the display of streams, and may thus need to know about new posts so that users of a mail client can be shown immediately when new information is posted. In a similar manner, a search engine 730 may provide search results to users that include real-time updating information from various posts that users are supplying to the system, and can receive such updated information by interacting with the update pump 708 via understood APIs and remote procedure calls (RPCs) where the two components are sub-components of a larger organization-wide system.

Various web front-ends are provided to permit the system 700 communicate over a network 706, such as the internet (and adjacent supporting networks). For example, the mail server 714 may provide typical web-based electronic mail functionality, though with the integration of posts and comments into users' in boxes, via a mail client 720. For example, streams may show up as discrete messages in user's in box, and may be updated in real time to include the latest comments on the streams and originating posts for the streams. Such content may be active, in that a user may be allowed to interact with it substantially to a level that they could if they were reviewing the streams in a dedicated stream reader. For example, selectable controls may be provided with a stream that is displayed by the email client 720, and a user may choose one in order to post a comment to be added to a stream, without having to leave the context of the message within the email client 720.

A profile server 710 generates code for representing user profiles such as profile 722 of user Joe Blow. The profile page may take the form of a standard feed page from a social networking site, arranged with a list of posts and comments from other users in reverse chronological order. In a similar manner, an activities front end 712 can generate a similar feed for a user's feed page 724, here for a user named Susie User. The profile page 722 and the feed page 724 may be very similar to each other, and can present content similar to that presented as part of a posting or micro-blogging section of mail client 720. In one example, the profile page 722 is what third parties see when they look at the user's account, while the feed page 724 is what the user himself or herself sees.

A search engine 730 and associated search front end 718 may provide a different sort of functionality for the system 700. Specifically, the search front end 718 may allow users to provide posts or comments from non-traditional sources, such as search boxes, e.g., on a search web page or in a search box on a toolbar installed on their machines an operating in concert with their web browsers. Such posts or comments may be submitted by users and may be received by the search front end in a standard manner, just as search requests are. The intent of a user to submit a post rather than a search query (or in addition to a search query) may be determined by syntactical analysis of the submission. In one example, if a query is preceded by the letter "z", with a space after it (see screen 728)—a construct that is seldom submitted as a real search query—the system may parse the submission apart and assume, from the syntax, that the user intends to post the remainder of the submitted query as a post to their social network.

Such a post may be made immediately or after confirming with the submitting user that they would like to make a posting. For example, a search results page 726 may be generated that contains actual search results for the submitted query (whether with or without the preceding "z") generated by the search engine 730 using data from index 738 in a conventional manner, and may be displayed below an area that shows the user the form of a proposed post and selectable controls by which the user can edit the post and can then confirm an intent to post the information to friends, followers, or others. The post may then be forwarded by the search front end 718 to the activity streams backend 702, along with identifying information for the user (e.g., a user ID identified from a cookie on the user's computing device when the user is logged onto a broader service that implements the system 700).

Other syntax submitted by a user may produce different results. For example, if a user enters an email address (e.g., of the form "name@domain.com"), the system may identify that syntax as indicating an intent to send the remaining text of the submission as an email message to the user at the provided email address. Likewise, if the user starts a submission with a control character followed by a communication mode identifier, the remainder of the submission may be submitted for posting in tat communication mode, either without or without first presenting the proposed action to the user and confirm that the user intends such a communication to occur. For example, if a user types "z blog I'm having a great time," the syntax may indicate to the system 700 that the user would like to post the submitted phrase "I'm having a good time" to the user's blog (where the identity of the blog may be determined by the system 700 using a user ID stored as a cookie on the user's computing device, and which can be correlated to an account for the user that is in turn correlated to the blog).

The search results and other information (e.g., posts and email messages) may be accompanied by targeted advertisements directed to the search query or other similar information, such as profile information, the text of posts or comments by a user, the text of posts or comments of users who have a relationship with a user (e.g., as friends, followers, or users that the first user follows). Such advertisements may be served, through the search front end 718, or the other front ends 710, 712, 714 to users of the system 700 and may be targeted using techniques like those employed in GOOGLE ADWORDS OR ADSENSE. Such serving of advertisements may depend on ad data in database 734, which may include information about advertisers, the text and other content for the advertisements, bid prices submitted by the various advertisers, and other relevant information needed to serves advertisements that are directed to users and/or streams of information directed from or to the users.

Various location-based services may be integrated with posts or comments, such as by identifying the locations (e.g., lat/long coordinates) or venues (e.g., stores, arenas, bars, or restaurants) from which posts or comments are made. Such services are provided in this example system 700 by a location server 742 and geo service 744. The location server 742 generally provides information about venues or other landmarks in response to receiving location information about a user of system 700. For example, when a user submits a post, geo-coordinates for the user may be provided with the post (e.g., via GPS functionality on the user's mobile computing device) or may be determined for the user by the system 700 (e.g., via cell tower or access point identification or triangulation). The geo-location information may be an estimated latitude and longitude of the mobile computing device and information identifying an accuracy of the estimation. The location server 742 may be made available through an API to various other components of the system 700.

The location server 742 may use such geo-location information to identify one or more venues (e.g., stores, restaurants, or bars) in the general location of the user, may use proximity of the user to each venue and other signals (e.g., popularity of each venue as determined from search queries submitted with the venue name, check-ins at the venue by users of the system 700, a volume of activity associated with posts from the venue, a reputation of a post's author, for example, through number of subscribers, a volume of comments on posts, or a similarly determined reputation of the subscribers) to provide a ranked list of venues in the geographic area that the user may be in. The user may be presented with a single suggestion for a venue or several suggested venues. The user may then select one such venue, and that venue may be associated with the post when other users review it. For example, the post may be accompanied by meta data indicating that the post was "Posted from Dive Bar," and other users may select the name "Dive Bar" to see additional information about the venue, including other posts from the venue, ratings of the venue, streams that belong to the venue (e.g., if a manager of the venue has made the venue a user of the system 700) and other similar information.

The location server 742 may obtain information that it needs to provide such functionality from various external services, such as geo service 744. Geo service 744 may be a service that communicates via standard APIs to receive location information (e.g., lat/long coordinates) and to provide more advanced information in response. The more advanced information may include a street address that is determined to be associated with the lat/long coordinates (e.g., a street address that is nearest to a particular location represented by the lat/long coordinates). The more advance information may also include a list of venue names that are geographically near the particular location, street addresses for the venues, descriptive information for the venues, map tiles that are associated with the particular location, and a relevance score for each venue. The relevance score for each venue may identify how relevant the particular venue is based on any combination of (i) the received location information, (ii) an accuracy of the received location information, and (iii) a distance between the venue and a location identified by the received location information.

Other components may interact with the components already described to provide additional functionality foe the system 700. For example, a crawler 750 may crawl various posts and comments for the purpose of indexing the content in the system 700, so that, for example, search engine 730 may readily deliver search results that include the latest postings by users to the system 700. Also, spam server 748 may communicate with the activity streams backend 702 and/or the update pump 708 to identify posts or comments that may be inappropriate (e.g., offensive, abusive, or otherwise inappropriate), duplicative, deceptive (e.g., in which one user poses as another user), and to act appropriately with respect to such content (e.g., providing for automatic and/or manual review of the content and perhaps removing the content from the system 700 or making the content hidden).

Finally, a recommendation server 740 may be provided with any new activity or post that is submitted to the system 700 (e.g., via the activity streams back-end 702). The recommendation server 740 may write back to the activity streams backend 702 about the number of people who should receive the activity. Such information may be saved so that the next time a message is sent out about the activity (e.g., a comment on the activity), the new recommended users also get the activity. A quality score can be computed when determining what users should receive an activity, and the score can be determined by factors such as the distance of relationship between a user and other users who have posted to or recommended an activity, interests of a user as identified in the user's profile (e.g., the user is a member of a classic cars group in a social network, and thus is more likely to receive notices about activities relating to classic cars), or interests as identified by posts or other submissions that the user makes, users or activities that the user follows, and the like. A quality threshold may be set by the recommendation server 740 in order to maintain an adequate level of recommendations (not too many and not too few).

Using the components described here, then, the system 700 may provided for integration of various modes of posting and receiving content that is provided in streams, such as micro-blog posts and comments on such posts. Users may post in various ways, including directly into search boxes on search pages or toolbars, so that such users may be more tightly integrated into systems provided by the providers of the pages or toolbars, and may provide posts in contexts with which they are already very familiar. Also, the users may review posts and other content in their email client, also in a manner that is already familiar to them and does not require them to leave a familiar application in order to review such posts. Moreover, the content may be rich for the users, such that it may include information about locations and venues at those locations (from which a reader of the content may obtain additional information, such as from hyperlinks provided in posts), and the users may respond to posts in-line, such as from their email applications. In all these, ways the system 700 may provide a communication facility that allows a user simpler and more complete interaction with friends and with other users, and may increase the level of knowledge that is made available to the users of the system 700.

Figure 8:
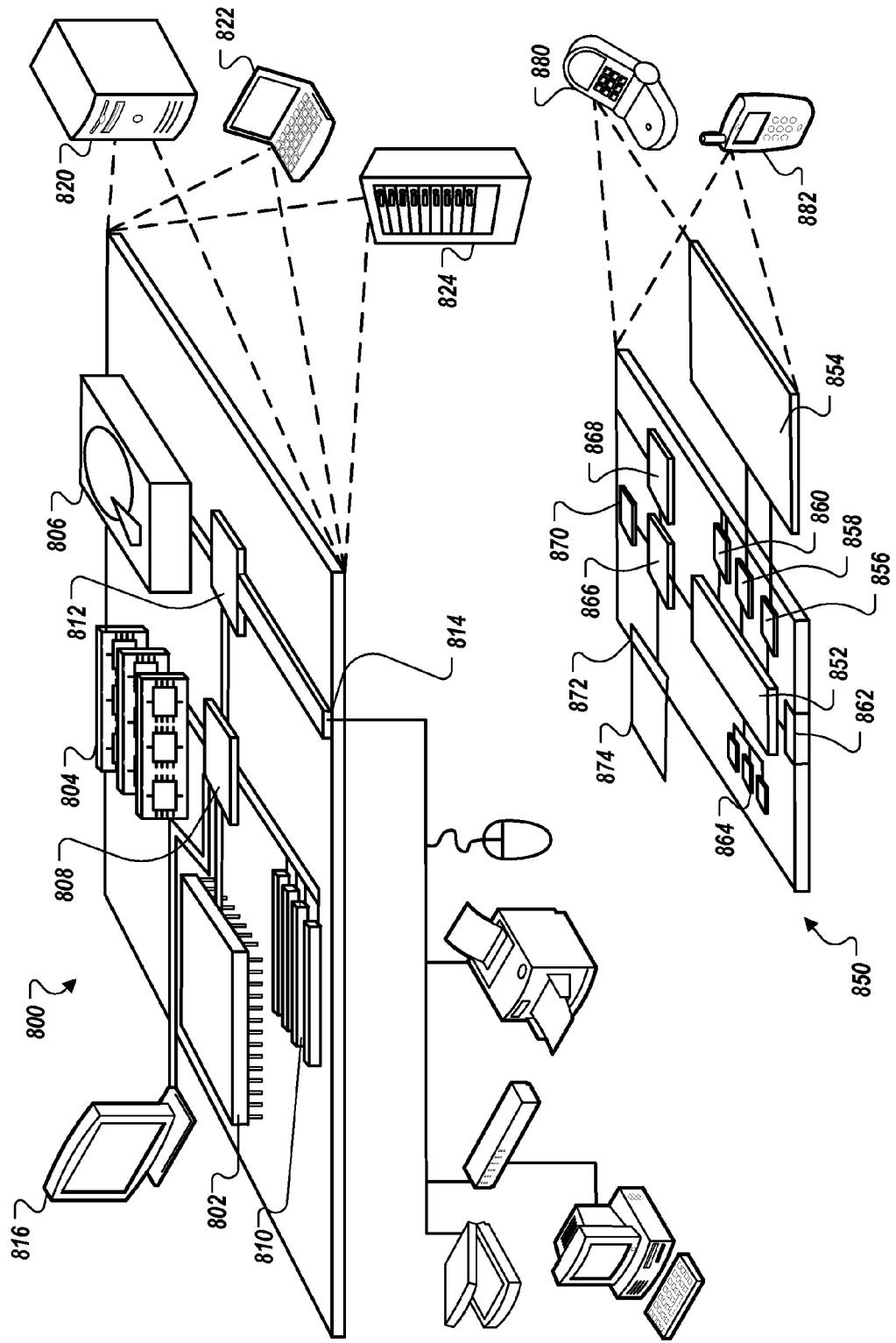
FIG. 8 is a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for confirming a venue of user location and switching between location contexts may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for switching between location contexts on a mobile computing device, the method comprising:

determining, by a processor of a mobile computing device, an estimated geographic location of the mobile computing device;

receiving, via an application program invoked on the mobile computing device, user input indicative of a user-identified location;

concurrently storing, in non-transitory computer-readable memory, (i) the estimated geographic location, and (ii) the user-identified location;

identifying one of the concurrently-stored locations as a current location;

presenting, on a display of the mobile computing device, (i) a plurality of interface elements that each identify a venue that is geographically near the current location, and (ii) a user selectable option to change the current location to the other of the concurrently-stored locations;

receiving, via the mobile computing device, user input that changes the current location from one to the other of the concurrently-stored locations, the user input indicative of user selection of the user selectable option to change the current location to the other of the concurrently-stored locations; and in response to receiving the user input that changes the current location from one to the other of the concurrently-stored locations, presenting, on the display of the mobile computing device, a plurality of interface elements that each identify a venue that is geographically near the other of the concurrently-stored locations.

2. The computer-implemented method of claim 1, wherein determining the estimated geographic location of the mobile computing device includes determining the estimated geographic location based on receiving signals from one or more wireless beacons, wherein the one or more wireless beacons are satellites in a global satellite-based location identification system.

3. The computer-implemented method of claim 1, wherein determining the estimated geographic location of the mobile computing device includes determining the estimated geographic location based on receiving signals from one or more wireless beacons, wherein the one or more wireless beacons are base station transmitting antennas in a ground-based wireless communication network.

4. The computer-implemented method of claim 1, wherein receiving user input indicative of the user-identified location includes receiving user-selection of a geographic location on a map presented on a display of the mobile computing device.

5. The computer-implemented method of claim 1, wherein receiving user input indicative of the user-identified location includes receiving user-selection of a search result that is presented on a display of the mobile computing device in response to a user-provided search engine query.

6. The computer-implemented method of claim 1, wherein receiving user input indicative of the user-identified location includes receiving latitude and longitude coordinates from the application program.

7. The computer-implemented method of claim 1, further comprising:
providing, from the mobile computing device to a server system, the current location;
receiving, at the mobile computing device and from the server system, a plurality of venues that are geographically located near the current location, wherein the plurality of venues correspond to the plurality of presented interface elements.

8. The computer-implemented method of claim 1, further comprising:
presenting, on the display, (i) a graphical interface element that identifies the current location, and (ii) a graphical interface element that, when selected by a user, invokes the current location to change to the other of the concurrently-stored locations.

9. The computer-implemented method of claim 8, wherein the current location can be changed with single-user input action.

10. The computer-implemented method of claim 8, wherein the interface element that invokes the current location to change includes an identification of the other location.

11. The computer-implemented method of claim 10, wherein a graphical interface element that identifies the estimated geographic location, as either the graphical interface element that identifies the current location or the graphical interface element that identifies the other location, updates to identify a newly estimated geographic location as subsequent determinations of the estimated geographic location are performed.

12. The computer implemented method of claim 8, wherein, in addition to the graphical interface element that identifies the current location, the display does not include more than a single one graphical interface element that identifies a location, where the single one graphical interface element corresponds to the other of the concurrently-stored locations.

13. The computer implemented method of claim 8, wherein the single one graphical interface element (i) includes an identification of the other location and (ii) is the interface element that changes the current location.

14. The computer-implemented method of claim 1, wherein selection of an interface element that identifies a venue invokes a display of information about the venue.

15. The computer-implemented method of claim 1, wherein selection of an interface element that identifies a venue assigns the venue as the user-identified location.

16. The computer-implemented method of claim 1, further comprising:
receiving user-input that invokes the application program;
receiving user-input that identifies, in the invoked application program, a new user-identified location; and
receiving, from the application program, the new user-identified location, wherein the user-identified location is replaced with the new user-identified location as one of the concurrently stored locations.

17. The computer-implemented method of claim 1, further comprising presenting on the display a single interface element, wherein repeated user-selection of the single interface element alternates which of the concurrently stored locations is the current location.

18. The computer-implemented method of claim 1, further comprising:
presenting, on the display, a list of vertically stacked interface elements,
wherein the list of vertically stacked interface elements includes:
(i) an interface element displaying the current geographic location,
(ii) the plurality of interface elements that each identify a venue,
(iii) an interface element for invoking an application program to select the user-identified location, and
(iv) an interface element displaying the user-identified location,
wherein the display does not include interface elements that identify venues and that are placed to either side of the vertically stacked interface elements.

19. A system for switching between location contexts on a mobile computing device, the system comprising:
location identification unit to determine an estimated geographic location of the mobile computing device, the location identification unit estimating the location based on wireless signals received from electronic beacons;
an application program to receive user-input identifying a location;
a current location identification unit to (i) concurrently store, in non-transitory computer-readable memory, the estimated geographic location and the user-identified location, and (ii) identify one of the estimated geographic location and user-identified location as a current location;
a server system to receive from the mobile computing device the current location and to provide to the mobile computing device a list of venues that the server system identifies as being relevant to the current location;
a display device to display (i) an indication of the current location, (ii) indications of the venues that are relevant to the current location, and (iii) an interface element for changing the current location to the other of the estimated geographic location and user-identified location such that venues identified as being relevant to the estimated geographic location are displayed when the estimated geographic location is identified as the current location and venues identified as being relevant to the user-identified location are displayed when the user-identified location is identified as the current location.

20. A system for switching between location contexts on a mobile computing device, the system comprising:
location identification unit to determine an estimated geographic location of the mobile computing device;

an application program to receive user-input identifying a location;

means to enable a user to toggle a current location of the mobile computing device between the estimated geographic location and the user-identified location; and a display device to display an indication of the current location and a list of venues that are relevant to the current location such that venues relevant to the estimated geographic location are displayed when the current location is toggled to the estimated geographic location and venues relevant to the user-identified location are displayed when the current location is toggled to the user-identified location.

* * * * *